United States Patent
Niwata et al.

(10) Patent No.: US 11,290,610 B2
(45) Date of Patent: Mar. 29, 2022

(54) MEDIUM CONVEYING APPARATUS FOR DETERMINING CONVEYANCE ABNORMALITY USING DEGREE OF SLIP OF MEDIUM

(71) Applicant: PFU LIMITED, Kahoku (JP)

(72) Inventors: Tomoyuki Niwata, Kahoku (JP); Ken Funaki, Kahoku (JP); Hiroyuki Kitano, Kahoku (JP)

(73) Assignee: PFU LIMITED, Kahoku (JP)

( * ) Notice: Subject to any disclaimer, the term of this patent is extended or adjusted under 35 U.S.C. 154(b) by 0 days.

(21) Appl. No.: 17/149,186

(22) Filed: Jan. 14, 2021

(65) Prior Publication Data

US 2021/0258444 A1 Aug. 19, 2021

(30) Foreign Application Priority Data

Feb. 19, 2020 (JP) .............................. JP2020-026210

(51) Int. Cl.
*H04N 1/047* (2006.01)
*H04N 1/00* (2006.01)

(52) U.S. Cl.
CPC ......... *H04N 1/047* (2013.01); *H04N 1/00037* (2013.01); *H04N 1/00082* (2013.01); *H04N 1/00602* (2013.01)

(58) Field of Classification Search
CPC ............ B65H 2220/03; B65H 2220/02; B65H 2220/11; B65H 2513/50; B65H 2511/51; B65H 2511/52; B65H 2511/528; B65H 2513/512; B65H 2220/01; B65H 2301/4318; B65H 2301/4452; B65H 2801/06; B65H 29/00; B65H 33/04; B65H 39/10; B65H 43/02; H04N 1/00018; H04N 1/00037; H04N 1/00639; H04N 1/00689; H04N 1/00702; H04N 1/0071;

(Continued)

(56) References Cited

U.S. PATENT DOCUMENTS 8,351,841 B2 * 1/2013 Kawaguchi ........ G03G 15/6567
399/388
8,474,814 B2 * 7/2013 Noda ..................... B65H 9/006
271/227

(Continued)

FOREIGN PATENT DOCUMENTS

JP 2016-160011 A 9/2016

*Primary Examiner* — Negussie Worku
(74) *Attorney, Agent, or Firm* — Lewis Roca Rothgerber Christie LLP

(57) ABSTRACT

A medium conveying apparatus includes a processor to determine that a conveyance abnormality of a medium has occurred when a first medium sensor does not detect the medium when a motor is driven by a first predetermined amount after starting feeding of the medium, or when a second medium sensor does not detect the medium when the motor is driven by a second predetermined amount after the first medium sensor detects the medium, and calculate a degree of a slip occurred between the medium and a feed roller from when a front end of the medium passes through a position of the first medium sensor until the front end of the medium passes through a position of the second medium sensor. The processor changes the first predetermined amount or the second predetermined amount based on the degree of the slip of a medium fed in the past.

20 Claims, 13 Drawing Sheets

(58) Field of Classification Search
CPC ........... H04N 1/00718; H04N 1/00734; H04N 1/00745; H04N 1/00748; H04N 1/00769; H04N 1/3263
USPC ......................................................... 358/498
See application file for complete search history.

(56) References Cited

U.S. PATENT DOCUMENTS

| | | | |
|---|---|---|---|
| 10,897,549 B2* | 1/2021 | Shiota | H04N 1/00809 |
| 2004/0126162 A1* | 7/2004 | Nishino | G03G 15/6561 |
| | | | 399/395 |
| 2019/0020779 A1* | 1/2019 | Seki | H04N 1/409 |
| 2020/0172357 A1* | 6/2020 | Arimori | B65H 7/06 |
| 2020/0177751 A1* | 6/2020 | Shiota | B65H 3/063 |
| 2021/0011408 A1* | 1/2021 | Honda | G03G 15/55 |
| 2021/0058519 A1* | 2/2021 | Shiota | H04N 1/00702 |
| 2021/0253387 A1* | 8/2021 | Funaki | B65H 3/06 |

* cited by examiner

FIG. 6

| IDENTIFICATION NUMBER | SLIP DEGREE | CONVEYANCE TIME | SKEW FLAG | SIZE |
|---|---|---|---|---|
| 1 | 5 | 2020/1/1 12:00:00.000 | OFF | A4 |
| 2 | 20 | 2020/1/1 12:00:00.100 | ON | A4 |
| 3 | 10 | 2020/1/1 12:00:00.200 | OFF | A6 |
| ... | ... | ... | ... | ... |

MEDIUM CONVEYING APPARATUS FOR DETERMINING CONVEYANCE ABNORMALITY USING DEGREE OF SLIP OF MEDIUM

CROSS-REFERENCE TO RELATED APPLICATIONS

This application is based upon and claims the benefit of priority of prior Japanese Patent Application No. 2020-026210, filed on Feb. 19, 2020, the entire contents of which are incorporated herein by reference.

TECHNICAL FIELD

Embodiments discussed in the present specification relate to medium conveyance.

BACKGROUND

In a medium conveying apparatus such as a scanner, a conveyance abnormality such as a jam (paper jam) may occur when a medium moves in a conveyance path. The medium conveying apparatus needs to accurately determine whether or not a medium conveyance abnormality has occurred in order to stop the medium conveyance to prevent damaging to the medium when the medium conveyance abnormality occurs.

An image forming apparatus to determine that a paper jam has occurred when a conveyance time from the start of paper feeding until the paper is detected by a paper detection sensor exceeds a predetermined jam detection reference time is disclosed (Japanese Patent Application Laid-Open No. 2016-160011). The image forming apparatus specifies a difference between the conveyance time and a predetermined reference value, specifies an average value of the difference between the conveyance time and the reference value for a predetermined number of sheets as a sliding amount, and changes the jam detection reference time so that the jam detection reference time is longer when the specified sliding amount exceeds a predetermined threshold value.

SUMMARY

According to some embodiments, a medium conveying apparatus includes a feed roller to separate and feed a medium, a motor to drive the feed roller, an imaging device to image the medium, a conveyance roller to convey the medium fed by the feed roller to the imaging device, a first medium sensor located between the feed roller and the conveyance roller, a second medium sensor located between the conveyance roller and the imaging device, and a processor to determine that a conveyance abnormality of the medium has occurred when the first medium sensor does not detect the medium when the motor is driven by a first predetermined amount after starting feeding of the medium, or when the second medium sensor does not detect the medium when the motor is driven by a second predetermined amount after the first medium sensor detects the medium, and calculate a degree of a slip occurred between the medium and the feed roller from when a front end of the medium passes through a position of the first medium sensor until the front end of the medium passes through a position of the second medium sensor. The processor changes the first predetermined amount or the second predetermined amount based on the degree of the slip of a medium fed in the past.

According to some embodiments, a method for controlling conveyance of a medium includes separating and feeding a medium by a feed roller, driving the feed roller by a motor, imaging by an imaging device, conveying the medium fed by the feed roller to the imaging device by a conveyance roller, determining that a conveyance abnormality of the medium has occurred when a first medium sensor located between the feed roller and the conveyance roller does not detect the medium when the motor is driven by a first predetermined amount after starting feeding of the medium, or when a second medium sensor located between the conveyance roller and the imaging device does not detect the medium when the motor is driven by a second predetermined amount after the first medium sensor detects the medium, and calculating a degree of a slip occurred between the medium and the feed roller from when a front end of the medium passes through a position of the first medium sensor until the front end of the medium passes through a position of the second medium sensor. The first predetermined amount or the second predetermined amount is changed based on the degree of the slip of a medium fed in the past.

According to some embodiments, a computer-readable, non-transitory medium stores a computer program. The computer program causes a medium conveying apparatus including a feed roller to separate and feed a medium, a motor to drive the feed roller, an imaging device to image the medium, a conveyance roller to convey the medium fed by the feed roller to the imaging device, a first medium sensor located between the feed roller and the conveyance roller, a second medium sensor located between the conveyance roller and the imaging device, to execute a process including determining that a conveyance abnormality of the medium has occurred when the first medium sensor does not detect the medium when the motor is driven by a first predetermined amount after starting feeding of the medium, or when the second medium sensor does not detect the medium when the motor is driven by a second predetermined amount after the first medium sensor detects the medium, and calculating a degree of a slip occurred between the medium and the feed roller from when a front end of the medium passes through a position of the first medium sensor until the front end of the medium passes through a position of the second medium sensor. The first predetermined amount or the second predetermined amount is changed based on the degree of the slip of a medium fed in the past.

BRIEF DESCRIPTION OF DRAWINGS

FIG. 6 is a schematic diagram illustrating an example of a data structure of a table of a degree of a slip.

DESCRIPTION OF EMBODIMENTS

It is to be understood that both the foregoing general description and the following detailed description are exemplary and explanatory, and are not restrictive of the invention, as claimed.

Hereinafter, a medium conveying apparatus, a method and a computer-readable, non-transitory medium storing a computer program according to an embodiment, will be described with reference to the drawings. However, it should be noted that the technical scope of the invention is not limited to these embodiments, and extends to the inventions described in the claims and their equivalents.

Figure 1:
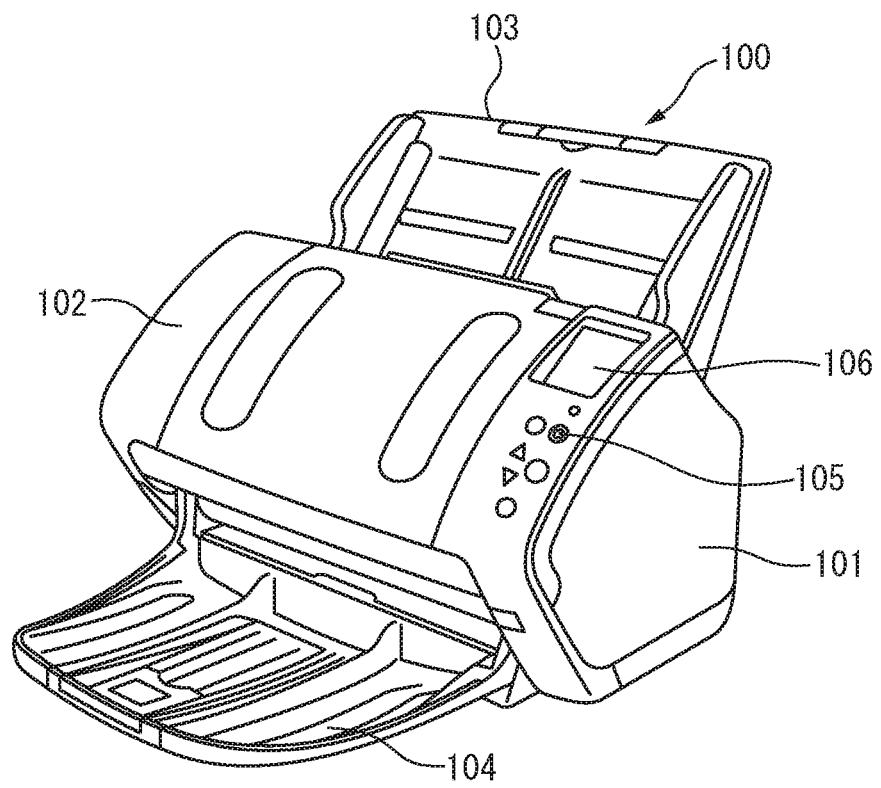
FIG. 1 is a perspective view illustrating a medium conveying apparatus 100 according to an embodiment.

FIG. 1 is a perspective view illustrating a medium conveying apparatus 100 configured as an image scanner. The medium conveying apparatus 100 conveys and images a medium being a document. A medium is paper, thick paper, a card, a brochure, a passport, etc. The medium conveying apparatus 100 may be a fax machine, a copying machine, a multifunctional peripheral MFP), etc. A conveyed medium may not be a document but may be an object being printed on etc., and the medium conveying apparatus 100 may be a printer etc.

The medium conveying apparatus 100 includes a lower housing 101, an upper housing 102, a medium tray 103, an ejection tray 104, an operation device 105, and a display device 106.

The upper housing 102 is located at a position covering the upper surface of the medium conveying apparatus 100 and is engaged with the lower housing 101 by hinges so as to be opened and closed at a time of medium jam, during cleaning the inside of the medium conveying apparatus 100, etc.

The medium tray 103 is engaged with the lower housing 101 in such a way as to be able to place a medium to be conveyed. The ejection tray 104 is engaged with the lower housing 101 in such a way as to be able to hold an ejected medium.

The operation device 105 includes an input device such as a button, and an interface circuit acquiring a signal from the input device, receives an input operation by a user, and outputs an operation signal based on the input operation by the user. The display device 106 includes a display including a liquid crystal or organic electro-luminescence (EL), and an interface circuit for outputting image data to the display, and displays the image data on the display.

Figure 2:
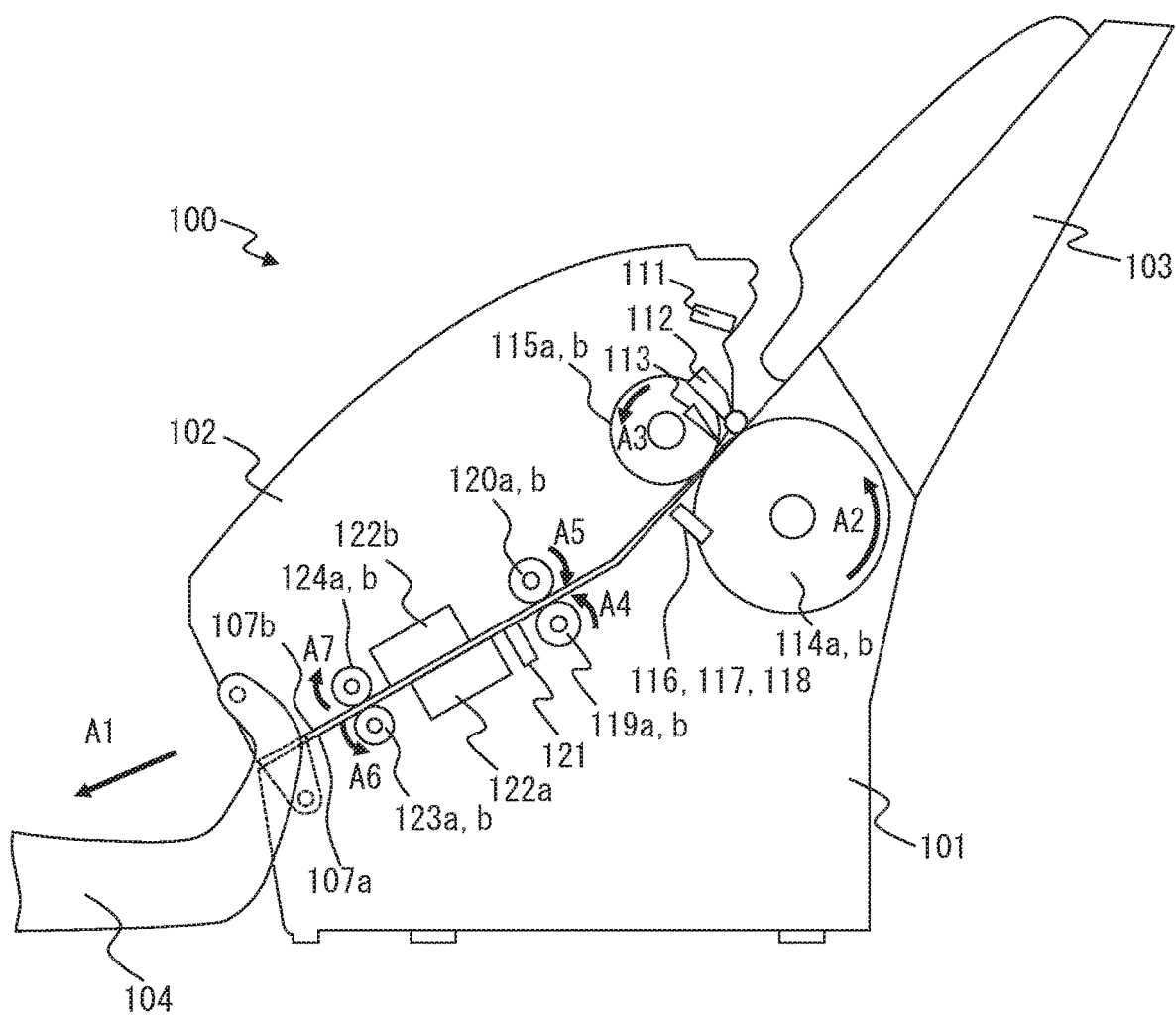
FIG. 2 is a diagram for illustrating a conveyance path inside the medium conveying apparatus 100.

FIG. 2 is a diagram for illustrating a conveyance path inside the medium conveying apparatus 100.

The conveyance path inside the medium conveying apparatus 100 includes a distance measuring sensor 111, a pick arm 112, a contact sensor 113, feed rollers 114a, 114b, brake rollers 115a, 115b, a first center sensor 116, a first side sensor 117, a second side sensor 118, first conveyance rollers 119a, 119b, second conveyance rollers 120a, 120b, a second center sensor 121, a first imaging device 122a, a second imaging device 122b, third conveyance rollers 123a, 123b and fourth conveyance rollers 124a, 124b, etc. The numbers of each roller is not limited to two, and may be one or three or more predetermined number, respectively.

Hereinafter, the feed rollers 114a and 114b may be collectively referred to as feed rollers 114. Further, the brake rollers 115a and 115b may be collectively referred to as brake rollers 115. Further, the first conveyance rollers 119a and 119b may be collectively referred to as first conveyance rollers 119. Further, the second conveyance rollers 120a and 120b may be collectively referred to as second conveyance rollers 120. Further, the first imaging device 122a and the second imaging device 122b may be collectively referred to as imaging devices 122. Further, the third conveyance rollers 123a and 123b may be collectively referred to as third conveyance rollers 123. Further, the fourth conveyance rollers 124a and 124b may be collectively referred to as fourth conveyance rollers 124.

A top surface of the lower housing 101 forms a lower guide 107a of a conveyance path of a medium, and a bottom surface of the upper housing 102 forms an upper guide 107b of the conveyance path of a medium. An arrow A1 in FIG. 2 indicates a medium conveying direction. Hereinafter, an upstream refers to an upstream in the medium conveying direction A1, and a downstream refers to a downstream in the medium conveying direction A1.

The distance measuring sensor 111, is provided in the upper housing 102, i.e., on the upper side from the conveyance path of the medium, and is located on the upstream side of the pick arm 112. The distance measuring sensor 111 is a sensor for detecting a medium amount (e.g., height) of the medium placed on the medium tray 103. The distance measuring sensor 111 is an infrared proximity distance sensor and measures a distance from an object existing at a facing position, based on a time difference between emission and reflection of infrared rays. The distance measuring sensor includes a light emitter and a light receiver. The light emitter irradiates light (infrared light) toward the medium tray 103 or the lower housing 101. On the other hand, the light receiver receives the light irradiated by the light emitter and reflected by the medium placed on the medium tray 103, and generates and outputs an optical signal which is an electrical signal corresponding to the received light. The optical signal indicates a time period from a time when the light emitter emits the light to a time when the light receiver receives the light. Since the time period from a time when the light emitter emits the light to a time when the light receiver receives the light varies according to the medium amount of the medium placed on the medium tray 103, the optical signal varies according to the medium amount of the medium placed on the medium tray 103. Therefore, the medium conveying apparatus 100 can detect the amount of the medium of the medium placed on the medium tray 103 based on the optical signal. The numbers of the distance measuring sensor 111 is not limited to one, and a plurality of the distance measuring sensors 111 may be spaced and arranged alongside in a width direction perpendicular to the medium conveying direction A1. The distance measuring sensor may be omitted.

The pick arm 112 is provided in the upper housing 102 and is located on the downstream side of the distance measuring sensor 111 and on the upstream side of a nip position of the feed rollers 114 and the brake rollers 115, particularly at a position facing the feed rollers 114 across the medium conveyance path. The pick arm 112 biases (presses) the medium placed on the medium tray 103 from above.

The contact sensor 113 is located on the upstream side of the feed rollers 114 and the brake rollers 115. The contact sensor 113 includes a contact detection sensor, and detects whether a medium is placed on the medium tray 103. The contact sensor 113 generates and outputs a first medium signal whose signal value changes in a state where the medium is placed on the medium tray 103 and a state where the medium is not placed.

The feed rollers 114 are provided on the lower housing 101 and sequentially feed a medium placed on the medium tray 103 from the lower side. The brake rollers 115 are provided in the upper housing 102 and are located to face the feed rollers 114. The feed rollers 114, together with the brake rollers 115, separate and feed the medium.

The first conveyance rollers 119 are provided on the lower housing 101. The second conveyance rollers 120 are provided in the upper housing 102, and are located to face the first conveyance rollers 119. The first and second conveyance rollers 119 and 120 are examples of conveyance rollers, and are located on the downstream side of the feed rollers 114 and the brake rollers 115 in the medium conveying direction A1, and convey the medium fed by the feed rollers 114 and the brake rollers 115 to the imaging device 122.

The first imaging device 122a is an example of an imaging device, and includes a line sensor based on a unity-magnification optical system type contact image sensor (CIS) including an imaging element based on a complementary metal oxide semiconductor (CMOS) linearly located in a main scanning direction. The first imaging device 122a includes a lens for forming an image on the imaging element, and an A/D converter for amplifying and analog/digital (A/D) converting an electric signal output from the imaging element. The first imaging device 122a sequentially generates and outputs line images acquired by imaging an area of a front surface of the conveyed medium facing the line sensor at certain intervals. Specifically, a pixel count of a line image in a vertical direction (subscanning direction) is 1, and a pixel count in a horizontal direction (main scanning direction) is larger than 1.

Similarly, the second imaging device 122b is an example of an imaging device, and includes a line sensor based on a unity-magnification optical system type CIS including an imaging element based on a CMOS linearly located in a main scanning direction. Further, the second imaging device 122b includes a lens for forming an image on the imaging element, and an A/D converter for amplifying and A/D converting an electric signal output from the imaging element. The second imaging device 122b sequentially generates and outputs line images acquired by imaging an area of a back surface of the conveyed medium facing the line sensor at certain intervals.

Only either of the first imaging device 122a and the second imaging device 122b may be located in the medium conveying apparatus 100, and only one side of a medium may be read. Further, a line sensor based on a unity-magnification optical system type CIS including an imaging element based on charge coupled devices (CCDs) may be used in place of the line sensor based on a unity-magnification optical system type CIS including an imaging element based on a CMOS. Further, a line sensor based on a reduction optical system type line sensor including an imaging element based on CMOS or CCDs.

The third conveyance rollers 123 are provided on the lower housing 101. The fourth conveyance rollers 124 are provided in the upper housing 102, and are located to face the third conveyance roller 123. The third and fourth conveyance rollers 123 and 124 are located on the downstream side of the first and second conveyance rollers 119 and 120 in the medium conveying direction A1, and convey the medium conveyed by the first and second conveyance rollers 119 and 120 to the downstream side.

A medium placed on the medium tray 103 is conveyed between the lower guide 107a and the upper guide 107b in the medium conveying direction A1 by the feed rollers 114 rotating in a direction of an arrow A2 in FIG. 2. When a medium is conveyed, the brake rollers 115 rotate in a direction of an arrow A3. By the workings of the feed rollers 114 and the brake rollers 115, when a plurality of media are placed on the medium tray 103, only a medium in contact with the feed rollers 114, out of the media placed on the medium tray 103, is separated. Consequently, the medium conveying apparatus 100 operates in such a way that conveyance of a medium other than the separated medium is restricted (prevention of multi-feed).

The medium is fed between the first conveyance rollers 119 and the second conveyance rollers 120 while being guided by the lower guide 107a and the upper guide 107b. The medium is fed between the first imaging device 122a and the second imaging device 122b by the first conveyance rollers 119 and the second conveyance rollers 120 rotating in directions of an arrow A4 and an arrow A5, respectively. The medium read by the imaging device 122 is ejected on the ejection tray 104 by rotating the third conveyance rollers 123 and the fourth conveyance rollers 124 in directions of an arrow A6 and an arrow A7, respectively.

Figure 3:
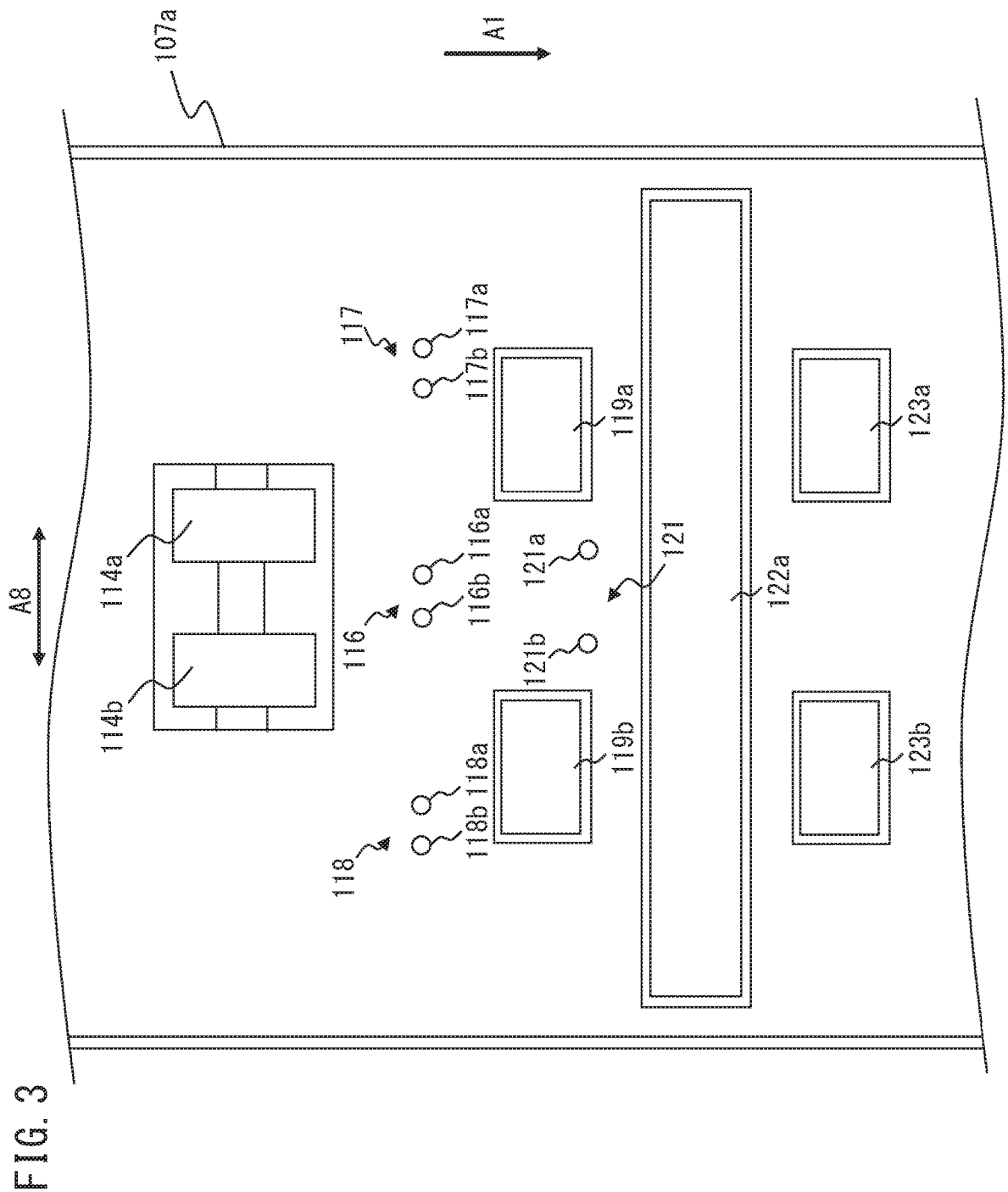
FIG. 3 is a schematic diagram for illustrating a first center sensor 116, etc.

FIG. 3 is a schematic diagram for illustrating the first center sensor 116, the first side sensor 117, the second side sensor 118, and the second center sensor 121. FIG. 3 is a schematic diagram of the lower housing 101 from above in a state in which the upper housing 102 is removed.

The first center sensor 116 is an example of a first medium sensor. The first center sensor 116 is located between the feed rollers 114 and the brake rollers 115, and the first conveyance rollers 119 and the second conveyance rollers 120 in the medium conveying direction A1, and on an almost central part in the direction A8 perpendicular to the medium conveying direction. The first center sensor 116 includes a first center light emitter 116a and a first center light receiver 116b provided on one side (the lower housing 101) of the medium conveyance path. Further, the first center sensor 116 includes a first center reflection member (unillustrated), such as a mirror, provided at a position (the upper housing 102) facing the first center light emitter 116a and the first center light receiver 116b with the medium conveyance path in between. The first center light emitter 116a emits light toward the medium conveyance path. On the other hand, the first center light receiver 116b receives light emitted by the first center light emitter 116a and reflected by the first center reflection member, and generates and outputs a first center signal being an electric signal based on intensity of the received light.

The first side sensor 117 and the second side sensor 118 are located at almost the same position as the first center sensor 116 in the medium conveying direction A1, and outside the first center sensor 116 in the direction A8 perpendicular to the medium conveying direction. The first and second side sensors 117 and 118 include respectively first and second side light emitters 117a and 118a, and first and second side light receivers 117b and 118b, each of which is provided on one side (the lower housing 101) of the medium conveyance path. Further, the first and second side sensors 117 and 118 include respectively a first and second side reflecting members (unillustrated), such as mirrors, provided at a position (the upper housing 102) facing the respective side light emitters and respective side light receivers with the medium conveyance path in between. The first and second side light emitters 117*a* and 118*a* emit light toward the medium conveyance path. On the other hand, the first and second side light receivers 117*b* and 118*b* receive light emitted by the first and second side light emitters 117*a* and 118*a* and reflected by the first and second side reflection members, respectively, and generate and output first and second side signals being electric signals based on intensity of the received light, respectively.

The second center sensor 121 is an example of a second medium sensor. The second center sensor 121 is located between the first conveyance rollers 119 and the second conveyance rollers 120, and the imaging device 122 in the medium conveying direction A1, at an almost central position in the direction A8 perpendicular to the medium conveyance direction A1. The second center sensor 121 includes a second center light emitter 121*a* and a second center light receiver 121*b* provided on one side (the lower housing 101) of the medium conveyance path. The second center sensor 121 includes a second center reflection member (unillustrated) such as a mirror provided at a position (the upper housing 102) facing the second center light emitter 121*a* and the second center light receiver 121*b* with the medium conveying path in between. The second center light emitter 121*a* emits light toward the medium conveyance path. On the other hand, the second center light receiver 121*b* receives light emitted by the second center light emitter 121*a* and reflected by the second center reflection member, and generates and outputs a second center signal being an electric signal based on intensity of the received light.

When a medium exists at each position of the first center sensor 116, the first side sensor 117, the second side sensor 118, and the second center sensor 121, light emitted by the light emitter in each sensor is shaded by the medium. Accordingly, a signal value of a signal generated by each sensor varies between a state in which a medium exists at a position of each sensor and a state in which a medium does not exist. Consequently, each of the first center sensor 116, the first side sensor 117, the second side sensor 118, and the second center sensor 121 detects whether or not a medium exists at the position. The light emitter and the light receiver in each sensor may be provided in positions facing one another with the conveyance path in between, and the reflection member may be omitted.

Figure 4:
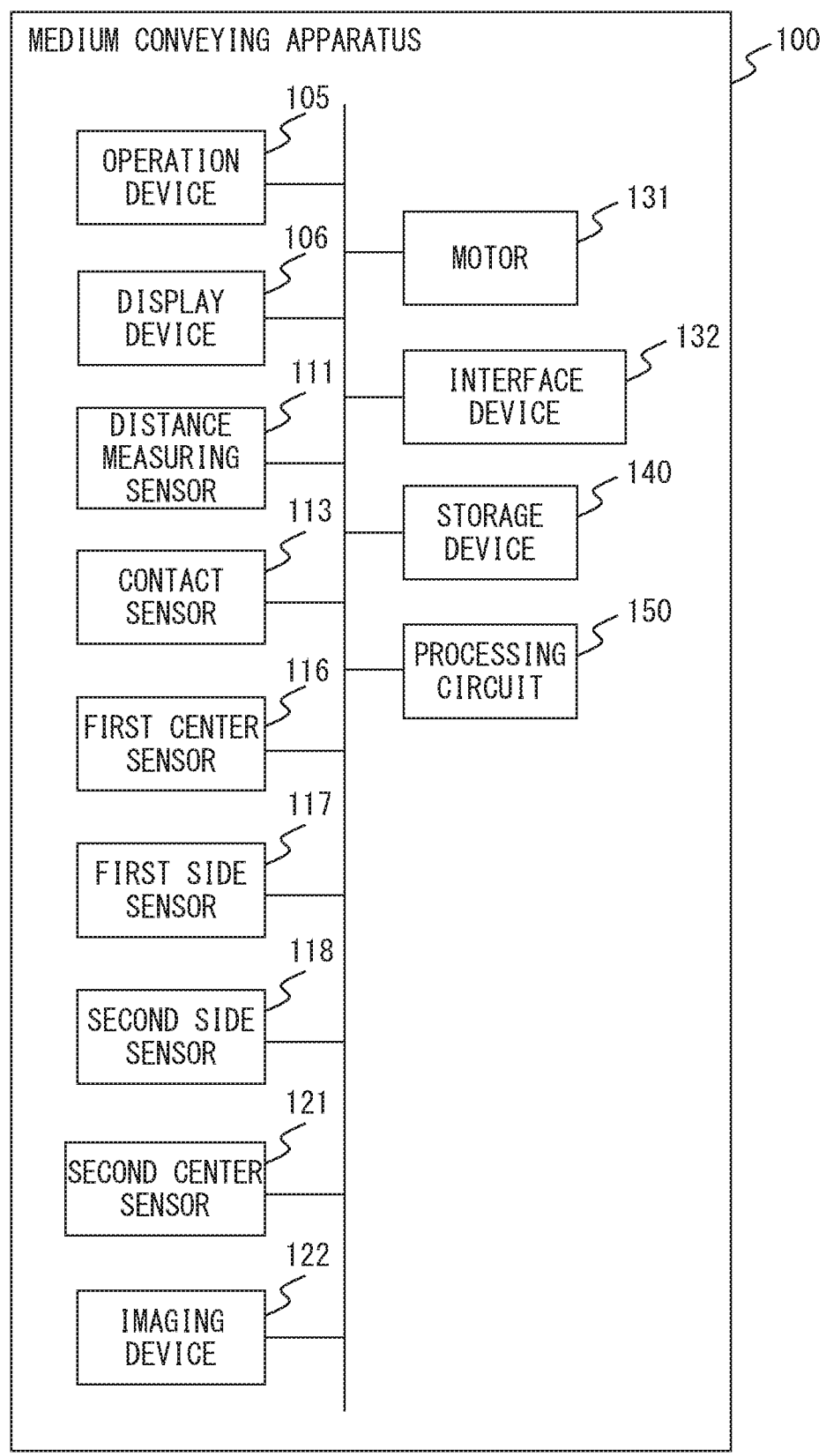
FIG. 4 is a block diagram illustrating a schematic configuration of the medium conveying apparatus 100.

FIG. 4 is a block diagram illustrating a schematic configuration of the medium conveying apparatus 100.

The medium conveying apparatus 100 further includes a motor 131, an interface device 132, a storage device 140, and a processing circuit 150, etc., in addition to the configuration described above.

The motor 131 includes one or more motors, and drives and rotates the feed rollers 114, the brake rollers 115, and the first to fourth conveyance rollers 119, 120, 123 and 124, by a control signal (pulse signal) from the processing circuit 150 to feed and convey the medium.

For example, the interface device 132 includes an interface circuit conforming to a serial bus such as universal serial bus (USB), is electrically connected to an unillustrated information processing device (for example, a personal computer or a mobile information terminal), and transmits and receives an input image and various types of information. Further, a communication module including an antenna transmitting and receiving wireless signals, and a wireless communication interface device for transmitting and receiving signals through a wireless communication line in conformance with a predetermined communication protocol may be used in place of the interface device 132. For example, the predetermined communication protocol is a wireless local area network (LAN).

The storage device 140 includes a memory device such as a random access memory (RAM) or a read only memory (ROM), a fixed disk device such as a hard disk, or a portable storage device such as a flexible disk or an optical disk. Further, the storage device 140 stores a computer program, a database, a table, etc., used for various types of processing in the medium conveying apparatus 100. The computer program may be installed on the storage device 140 from a computer-readable, non-transitory medium such as a compact disc read only memory (CD-ROM), a digital versatile disc read only memory (DVD-ROM), etc., by using a well-known setup program, etc. The storage device 140 stores a slip degree table, as data. Details of the slip degree table will be described later.

The processing circuit 150 operates in accordance with a program previously stored in the storage device 140. The processing circuit 170 is, for example, a CPU (Central Processing Unit). The processing circuit 150 may be a digital signal processor (DSP), a large scale integration (LSI), an application specific integrated circuit (ASIC), a field-programmable gate array (FPGA), etc.

The processing circuit 150 is connected to the operation device 105, the display device 106, the distance measuring sensor 111, the contact sensor 113, the first center sensor 116, the first side sensor 117, the second side sensor 118, the second center sensor 121, the imaging device 122, the motor 131, the interface device 132 and the storage device 140, etc., to control these units. The processing circuit 150 performs drive control of the motor 131, imaging control of the imaging device 122, etc., controls the conveyance of the medium, generates an input image, and transmits the input image to the information processing apparatus via the interface device 132.

Figure 5:
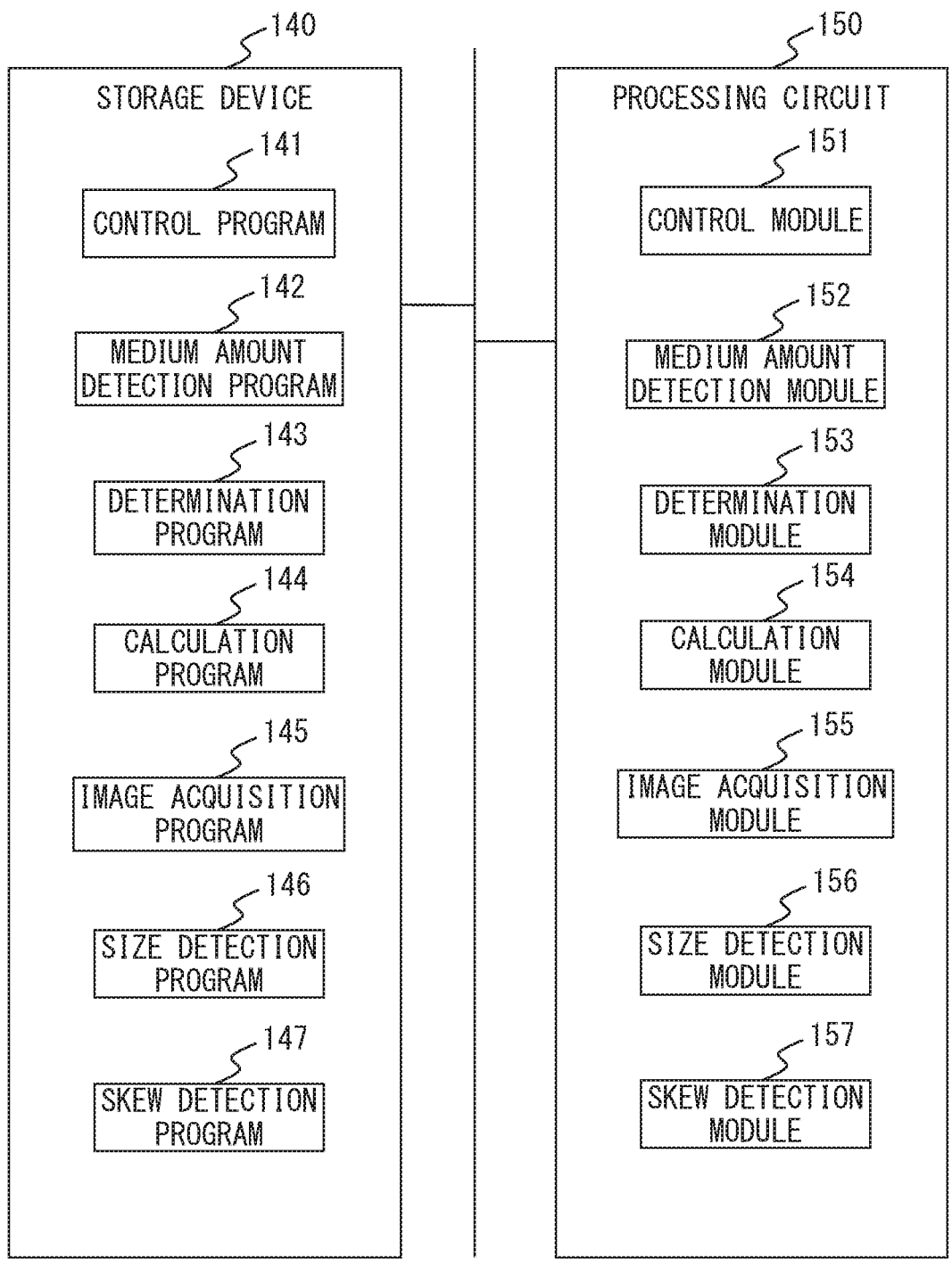
FIG. 5 is a diagram illustrating schematic configurations of the storage device 140 and the processing circuit 150.

FIG. 5 is a diagram illustrating schematic configurations of the storage device 140 and the processing circuit 150.

As shown in FIG. 5, the storage device 140 stores a control program 141, a medium amount detection program 142, a determination program 143, a calculation program 144, an image acquisition program 145, a size detection program 146 and a skew detection program 147, etc. Each of these programs is a functional module implemented by software operating on a processor. The processing circuit 150 reads each program stored in the storage device 140 and operates in accordance with each read program. Thus, the processing circuit 150 functions as a control module 151, a medium amount detection module 152, a determination module 153, a calculation module 154, an image acquisition module 155, a size detection module 156 and a skew detection module 157.

FIG. 6 is a schematic diagram illustrating an example of a data structure of the slip degree table.

As shown in FIG. 6, the slip degree table stores, for each conveyed medium, an identification number of each medium, a slip degree, a conveyance time, a skew flag, and a size, in association with each other. The identification number is a number for identifying the conveyed medium and is uniquely assigned to each medium. The slip degree is a degree of a slip occurred between a medium and the feed rollers 114 from when a front end of the medium passes through a position of the first center sensor 116 until the front end of the medium passes through a position of the second center sensor 121. The conveyance time is a time at which the medium was conveyed. The skew flag is set to ON when a skew of the medium is detected, and is set to OFF when a skew of the medium is not detected. The size is a size of the medium, such as A3 size, A4 size, etc.

Figure 7:
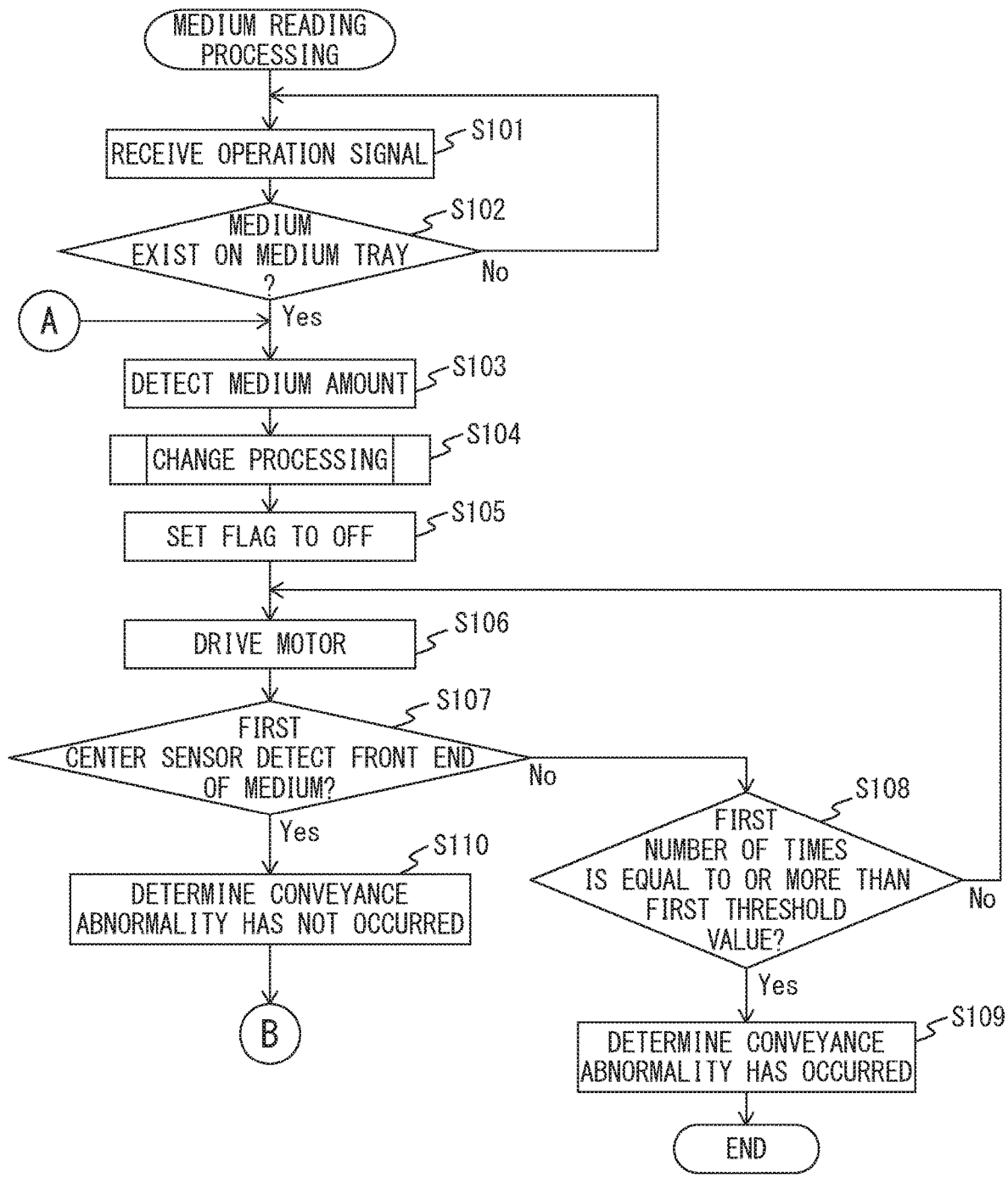
FIG. 7 is a flowchart illustrating an operation example of the medium reading processing.
Figure 8:
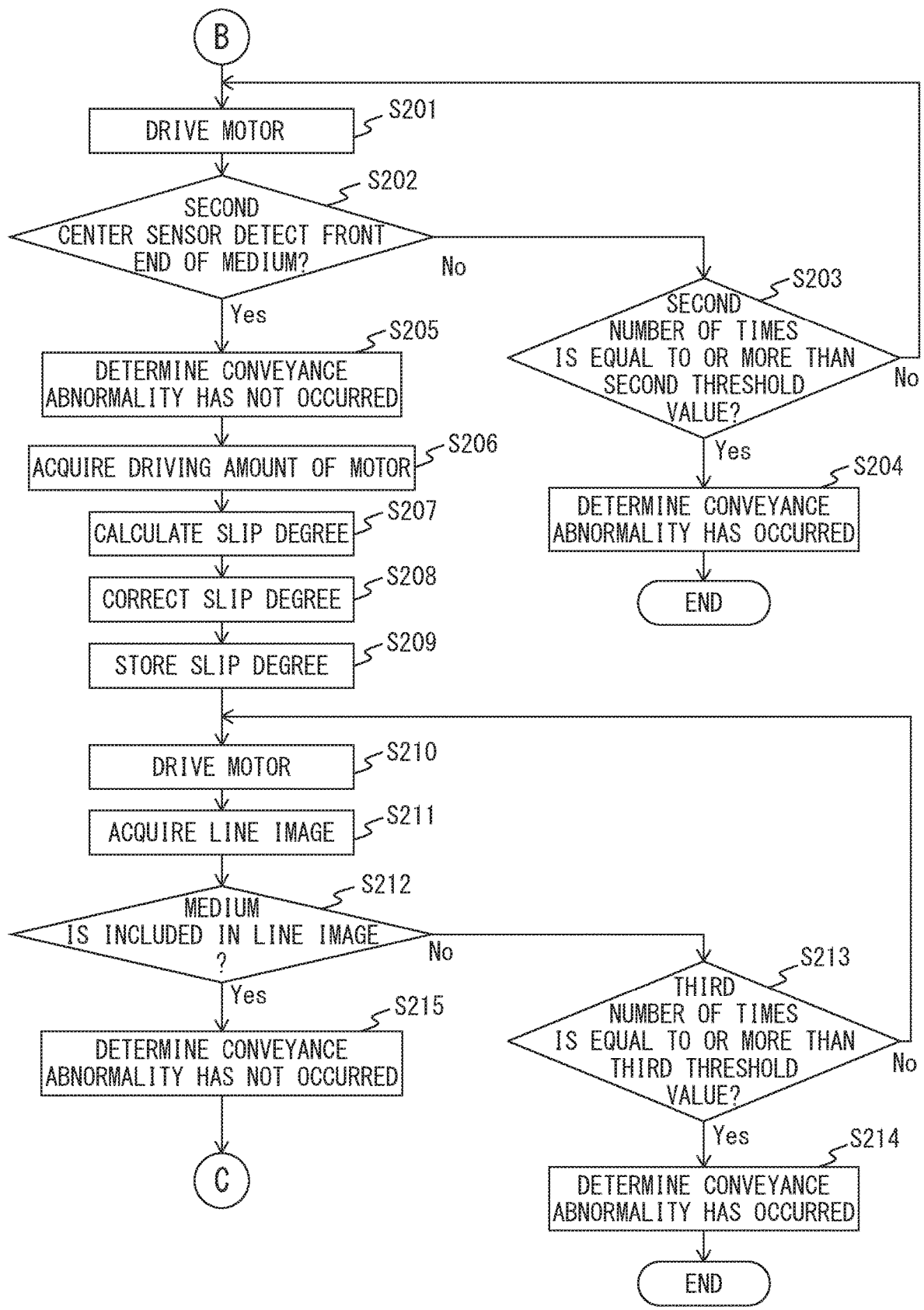
FIG. 8 is a flowchart illustrating an operation example of the medium reading processing.
Figure 9:
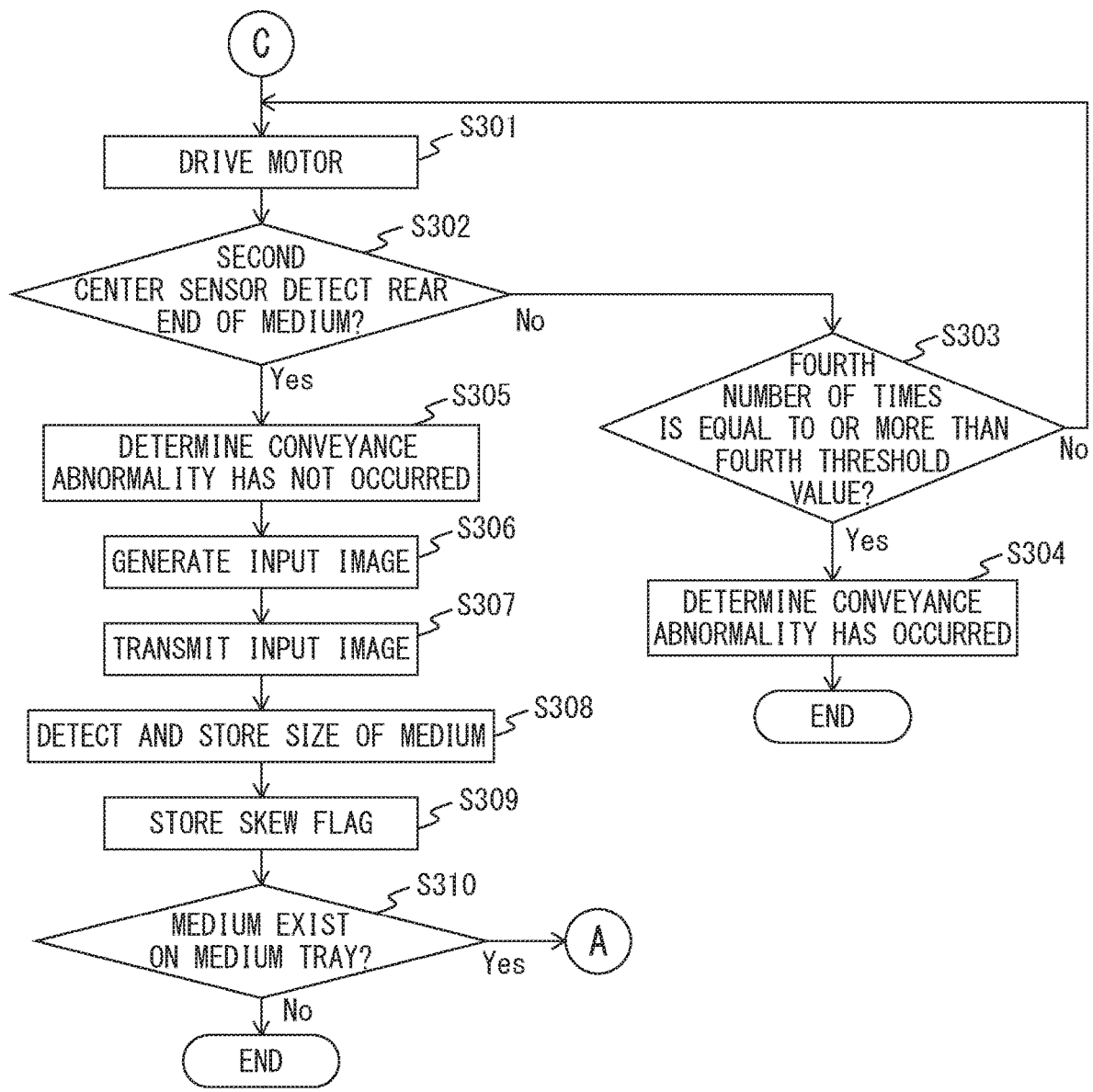
FIG. 9 is a flowchart illustrating an operation example of the medium reading processing.

FIGS. 7 to 9 are flowcharts illustrating an operation example of the medium reading process of the medium conveying apparatus 100.

Referring to the flowchart illustrated in FIGS. 7 to 9, the operation example of the medium reading processing in the medium conveying apparatus 100 will be described below. The operation flow described below is executed mainly by the processing circuit 150 in cooperation with each element in the medium conveying apparatus 100, in accordance with a program previously stored in the storage device 140. The flow of operation shown in FIGS. 7 to 9 is executed periodically.

First, the control module 151 stands by until an instruction to read a medium is input by a user by use of the operation device 105, and an operation signal instructing to read the medium is received from the operation device 105 (step S101).

Next, the control module 151 acquires the first medium signal from the contact sensor 113, and determines whether or not a medium is placed on the medium tray 103 based on the acquired first medium signal (step S102).

When a medium is not placed on the medium tray 103, the control module 151 returns the processing to step S101 and stands by until newly receiving an operation signal from the operation device 105.

On the other hand, when a medium is placed on the medium tray 103, the medium amount detection module 152 acquires an optical signal from the distance measuring sensor 111, and detects a medium amount of the medium placed on the medium tray 103, based on the acquired optical signal (step S103). The storage device 140 stores, in advance, a table indicating a relationship between a signal value of the optical signal and the medium amount of a medium placed on the medium tray 103, based on a prior experiment of acquiring the optical signals while changing the medium amount of the medium placed on the medium tray 103. The medium amount detection module 152 specifies the medium amount corresponding to the signal value of the acquired optical signal in the table stored in the storage device 140, as the medium amount of the medium placed on the medium tray 103.

Next, the determination module 153 executes a change processing (step S104). The determination module 153 changes a parameter for determining whether or not a conveyance abnormality of the medium has occurred in the change processing. Details of the change processing will be described later.

Next, the skew detection module 157 sets the skew flag to OFF (step S105). The skew flag is set to ON when the skew of the medium is detected in a skew detection processing to be described later.

Next, the control module 151 drives the motor 131 to rotate the feed rollers 114, the brake rollers 115, and the first to fourth conveyance rollers 119, 120, 123 and 124 (step S106). The control module 151 drives the motor for driving the feed rollers 114 in the motor 131 by the first driving amount, to cause the feed rollers 114 to feed the medium. An initial value of the first driving amount is set to a number of pulses for conveying a medium whose front end is located at a nip position of the feed rollers 114 and the brake rollers 115 until the front end reaches a position of the first center sensor 116. The first driving amount may be changed in the change processing.

Next, the determination module 153 determines whether or not the first center sensor 116 has detected the front end of the medium, i.e., the front end of the medium has passed through the position of the first center sensor 116 (step S107). The determination module 153 acquires the first center signal periodically from the first center sensor 116, and determines whether or not the medium is present at the position of the first center sensor 116, based on the acquired first center signal. The determination module 153 determines that the first center sensor 116 has detected the front end of the medium and the front end of the medium has passed through the position of the first center sensor 116 when the signal value of the first center signal changes from a value indicating that there is no medium to a value indicating that a medium is present.

When the first center sensor 116 has not detected the front end of the medium yet, the determination module 153 determines whether or not a first number of times wherein the motor for driving the feed rollers 114 is driven by the first driving amount is equal to or more than the first threshold value (step S108). An initial value of the first threshold value is set to a number of times of retries (for example, three) allowed for the medium conveying apparatus 100. The first threshold value may be changed by the change processing. When the first number of times is less than the first threshold value, the determination module 153 returns the process to step S106, and repeats the processes of steps S106 to S108.

On the other hand, when the first number of times is equal to or more than the first threshold value, the determination module 153 determines that a conveyance abnormality such as a jam (paper jam) or a conveyance stop due to a slip of the medium has occurred around the feed rollers 114 and the brake rollers 115 (step S109), and ends the series of steps. In other words, the determination module 153 determines that the conveyance abnormality of the medium has occurred when the first center sensor 116 does not detect the medium when the motor for driving the feed rollers 114 is driven by the first predetermined amount after starting feeding of the medium. The first predetermined amount is an amount acquired by multiplying the first driving amount by the first threshold value. In this case, the control module 151 stops feeding and conveying the medium.

On the other hand, in step S107, when the first center sensor 116 has detected the front end of the medium, the determination module 153 determines that the conveyance abnormality of the medium has not occurred around the feed rollers 114 and the brake rollers 115 (step S110). In other words, the determination module 153 determines that the conveyance abnormality of the medium has not occurred at the present time when the first center sensor 116 detects the medium until the motor for driving the feed rollers 114 is driven by the first predetermined amount.

The first predetermined time for driving the motor for driving the feed rollers 114 by the first predetermined amount is uniquely determined by the first driving amount and the first threshold value. In other words, the determination module 153 determines that the conveyance abnormality of the medium has occurred when the time from starting feeding of the medium until the first center sensor 116 detects the medium is equal to or more than the first predetermined time. On the other hand, the determination module 153 determines that the conveyance abnormality of the medium has not occurred at the present time when the time from the starting feeding of the medium until the first center sensor 116 detects the medium is less than the first predetermined time. Thus, the determination module 153 determines whether or not the conveyance abnormality of the medium has occurred, based on a comparison between the time from the starting feeding of the medium until the first center sensor 116 detects the medium and a threshold value (the first predetermined time), Next, the control module 151 drives the motor 131 to rotate the feed rollers 114, the brake rollers 115, and the first to fourth conveyance rollers 119, 120, 123 and 124 (step S201). The control module 151 drives the motor for driving the feed rollers 114 in the motor 131 by a second driving amount, to cause the feed roller 114 to feed the medium. An initial value of the second driving amount is set to a number of pulses by which the medium whose front end is located at the position of the first center sensor 116 is conveyed until the front end reaches the position of the second center sensor 121. The second driving amount may be changed in the change processing.

Next, the determination module 153 determines whether or not the second center sensor 121 has detected the front end of the medium, i.e. the front end of the medium has passed through the position of the second center sensor 121 (step S202). The determination module 153 acquires the second center signal periodically from the second center sensor 121, and determines whether or not the medium is present at the position of the second center sensor 121, based on the acquired second center signal. The determination module 153 determines that the second center sensor 121 has detected the front end of the medium, and the front end of the medium has passed through the position of the second center sensor 121 when the signal value of the second center signal changes from a value indicating that there is no medium to a value indicating that the medium is present.

When the second center sensor 121 has not detected the front end of the medium yet, the determination module 153 determines whether or not a second number of times wherein the motor for driving the feed rollers 114 is driven by the second driving amount is equal to or more than the second threshold value (step S203). An initial value of the second threshold value is set to a number of times of retries (for example, three) allowed for the medium conveying apparatus 100. The second threshold value may be changed by the change processing. When the second number of times is less than the second threshold value, the determination module 153 returns the process to step S201, and repeats the processes of steps S201 to S203.

On the other hand, when the second number of times is equal to or more than the second threshold value, the determination module 153 determines that the conveyance abnormality of the medium has occurred between the first center sensor 116 and the second center sensor 121 (step S204), and ends the series of steps. In other words, the determination module 153 determines that the conveyance abnormality of the medium has occurred when the second center sensor 121 does not detect the medium when the motor for driving the feed roller 114 is driven by the second predetermined amount after the first center sensor 116 detects the medium. The second predetermined amount is an amount acquired by multiplying the second driving amount by the second threshold value. In this case, the control module 151 stops feeding and conveying the medium.

On the other hand, in step S202, when the second center sensor 121 detects the front end of the medium, the determination module 153 determines that the conveyance abnormality of the medium has not occurred between the first center sensor 116 and the second center sensor 121 (step S205). In other words, the determination module 153 determines that the conveyance abnormality of the medium has not occurred at the present time when the second center sensor 121 detects the medium until the motor for driving the feed roller 114 is driven by the second predetermined amount.

The second predetermined time for driving the motor for driving the feed roller 114 by the second predetermined amount is uniquely determined by the second driving amount and the second threshold value. In other words, the determination module 153 determines that the conveyance abnormality of the medium has occurred when the time from when the first center sensor 116 detects the medium until the second center sensor 121 detects the medium is equal to or more than the second predetermined time. On the other hand, the determination module 153 determines that the conveyance abnormality of the medium has not occurred at the present time when the time from when the first center sensor 116 detects the medium until the second center sensor 121 detects the medium is less than the second predetermined time. Thus, the determination module 153 determines whether or not the conveyance abnormality of the medium has occurred, based on a comparison between the time from when the first center sensor 116 detects the medium until the second center sensor 121 detects the medium and a threshold value (the second predetermined time).

Next, the calculation module 154 acquires a driving amount of the motor for driving the feed roller 114, by which the motor is driven from when the front end of the medium passes through the position of the first center sensor 116 the front end of the medium passes through the position of the second center sensor 121 (step S206). The calculation module 154 acquires the first center signal and the second center signal periodically from the first center sensor 116 and the second center sensor 121, and detects a timing that the front end of the medium passes through the position of the first center sensor 116 and the position of the second center sensor 121. The calculation module 154 acquires a number of pulses of the pulse signal supplied to the motor 131 to rotate the feed rollers 114 by the control module 151 from when the front end of the medium passes through the position of the first center sensor 116 until the front end of the medium passes through the position of the second center sensor 121, as the driving amount.

Next, the calculation module 154 calculates a degree of a slip occurred between the medium and the feed rollers 114 from when the front end of the medium passes through the position of the first center sensor 116 until the front end of the medium passes through the position of the second center sensor 121 as the slip degree (step S207). The calculation module 154, for example, calculates the slip degree S according to the following equation (1).

$$S = (T1/T2 - 1) \times 100 \tag{1}$$

Wherein, T1 is a conveyance distance of the medium by the feed rollers 114 from when the front end of the medium passes through the position of the first center sensor 116 until the front end of the medium passes through the position of the second center sensor 121. T1 is calculated by multiplying the driving amount acquired in step S206 by the conveyance distance by the feed roller 114 per pulse. T2 is a distance between the position of the first center sensor 116 and the position of the second center sensor 121. That is, the greater the amount that the medium is slipped by the feed roller 114 is, the greater the slip degree is.

Thus, the calculation module 154 calculates the slip degree, based on the driving amount of the motor for driving the feed roller 114 from when the front end of the medium passes through the position of the first center sensor 116 until the front end of the medium passes through the position of the second center sensor 121. Thus, the calculation module 154 can accurately calculate the degree of the slip occurred between the medium and the feed rollers 114.

Next, the calculation module 154 corrects the slip degree, based on the medium amount of the medium placed on the medium tray 103 detected by the medium amount detection module 152 (step S208). The slip degree is used in the change processing, to change a parameter for determining whether or not the conveyance abnormality of the medium has occurred. In the so-called bottom-first type medium conveying apparatus 100 in which the media placed on the medium tray 103 are fed in order from the lower side, the larger the amount of the medium placed on the medium tray 103 is, the larger the frictional force between the fed medium and the medium placed thereon is. That is, as the amount of the medium placed on the medium tray 103 is larger, the medium is likely to slip. Therefore, the slip degree calculated in a state where the amount of the medium placed on the medium tray 103 is large, is larger than the slip degree calculated in a state where the amount of the medium placed on the medium tray 103 is small. Therefore, the calculation module 154 corrects the calculated slip degree so that the larger the medium amount of the medium placed on the medium tray 103 is, the smaller the slip degree is. Thus, the medium conveying apparatus 100, regardless of the medium amount of the medium placed on the medium tray 103, can accurately determine whether or not the conveyance abnormality of the medium has occurred.

Next, the calculation module 154 stores the calculated slip degree in the slip degree table (step S209). The calculation module 154 assigns the identification number to the conveyed medium and stores the identification number, the slip degree, and the conveyance time (the current time) in association with each other in the slip degree table.

Next, the control module 151 drives the motor 131 to rotate the feed rollers 114, the brake rollers 115, and the first to fourth conveyance rollers 119, 120, 123 and 124 (step S210). The control module 151 drives the motor for driving the feed roller 114 in the motor 131 by a third driving amount, to cause the feed roller 114 to feed the medium. An initial value of the third driving amount is set to a number of pulses by which the medium whose front end is located at the position of the second center sensor 121 is conveyed until the front end reaches the position of the imaging device 122. The third driving amount may be changed in the change processing.

Next, the image acquisition module 155 acquires a line image from the imaging device 122 (step S211).

Next, the determination module 153 determines whether or not the medium is included in the line image (step S212). The determination module 153 determines whether or not the medium is included in the line image, based on gradation values of pixels in the line image. The determination module 153 calculates an average value of the gradation values of pixels in a predetermined area for each of the latest line image and the line image acquired immediately before. When an absolute value of a difference between the average value calculated from the latest line image and the average value calculated from the line image acquired immediately before is equal to or more than a gradation threshold value, the determination module 153 determines that the medium is included in the latest line image. On the other hand, when the absolute value of the difference is less than the gradation threshold value, the determination module 153 determines that the medium is not included in the latest line image. The gradation value is a luminance value or a color value (R value, G value or B value), The gradation threshold value is set to, for example, the difference (e.g., 20) of the gradation values that a person can visually determine the difference in luminance or color on the image.

the determination module 153 may determine that the medium is included in the line image when the absolute value of the difference between the average value calculated from the line image and a reference value is equal to or more than the gradation threshold value, and determine that the medium is not included in the line image when the absolute value is less than the gradation threshold value. The reference value is set to the gradation value of a pixel imaged in a state where the medium is not conveyed by the prior experiment.

Further, the determination module 153 may extract an edge pixel from the line image. In that case, the determination module 153 calculates an absolute value of a difference between luminance values of both of pixels adjacent to each pixel in a line image in a horizontal direction (hereinafter referred to as an adjacent difference value) and when the adjacent difference value exceeds a gradation threshold value, extracts the pixel as the edge pixel. The determination module 153 may calculate an absolute value of a difference between luminance values of two pixels apart from each pixel in a line image by a predetermined distance as the adjacent difference value. Further, the determination module 153 may extract the edge pixel by comparing the gradation value of the line image with the threshold value. For example, when the gradation value of a specific pixel is less than a threshold value and the gradation value of a pixel adjacent to the specific pixel or a pixel separated by a predetermined distance from the specific pixel is equal to or more than a threshold value, the determination module 153 sets the specific pixel as an edge pixel. The determination module 153 specifies an edge pixel located at the leftmost end and an edge pixel located at the rightmost end among the edge pixels extracted from the line image, and determines that the medium is included in the line image when the distance (the number of pixels) between the specified edge pixels is equal to or more than a predetermined distance.

When the medium is not included in the line image, the determination module 153 determines whether or not a third number of times wherein the motor for driving the feed rollers 114 is driven by a third driving amount is equal to or more than a third threshold value (step S213). An initial value of the third threshold value is set to a number of times of retries (for example, three) allowed for the medium conveying apparatus 100. The third threshold value may be changed by the change processing. When the third number of times is less than the third threshold, the determination module 153 returns the process to step S210, and repeats the processes of steps S210 to S213.

On the other hand, when the third number of times is equal to or more than the third threshold value, the determination module 153 determines that the conveyance abnormality of the medium has occurred between the second center sensor 121 and the imaging device 122 (step S214), and ends the series of steps. In other words, the determination module 153 determines that the medium conveyance abnormality has occurred when the medium has not reached an imaging position of the imaging device 122 when the motor for driving the feed rollers 114 is driven by the third predetermined amount after the second center sensor 121 detects the medium. The third predetermined amount is an amount acquired by multiplying the third driving amount by the third threshold value. In this case, the control module 151 stops feeding and conveying the medium.

On the other hand, in the step S212, when the medium is included in the line image, the determination module 153 determines that the conveyance abnormality of the medium has not occurred between the second center sensor 121 and the imaging device 122 (step S215). In other words, the determination module 153 determines that the conveyance abnormality of the medium has not occurred at the present time when the medium reaches the imaging position of the imaging device 122 until the motor for driving the feed rollers 114 is driven by the third predetermined amount.

The third predetermined time for driving the motor for driving the feed rollers 114 by the third predetermined amount is uniquely determined by the third driving amount and the third threshold value. In other words, the determination module 153 determines that the conveyance abnormality of the medium has occurred when a time from when the second center sensor 121 detects the medium until the medium reaches the imaging position of the imaging device 122 is equal to or more than the third predetermined time. On the other hand, the determination module 153 determines that the conveyance abnormality of the medium has not occurred at the present time when the time from when the second center sensor 121 detects the medium until the medium reaches the imaging position of the imaging device 122 is less than the third predetermined time. Thus, the determination module 153 determines whether or not the conveyance abnormality of the medium has occurred, based on a comparison between the time from when the second center sensor 121 detects the medium until the medium reaches the imaging position of the imaging device 122 and a threshold value (the third predetermined time).

Next, the control module 151 drives the motor 131 to rotate the feed rollers 114, the brake rollers 115, and the first to fourth conveyance rollers 119, 120, 123 and 124 (step S301). The control module 151 drives the motor for driving the feed roller 114 in the motor 131 by a fourth driving amount, to cause the feed rollers 114 to feed the medium. An initial value of the fourth driving amount is set to a number of pulses by which a medium of the maximum size supported by the medium conveying apparatus 100 whose front end is located in the position of the imaging device 122 is conveyed until a rear end of the medium reaches the position of the second center sensor 121. The fourth driving amount may be changed in the change processing.

Next, the determination module 153 determines whether or not the second center sensor 121 has detected the rear end of the medium, i.e. the rear end of the medium has passed through the position of the second center sensor 121 (step S302). The determining module 153 determines that the second center sensor 121 detects the rear end of the medium and the rear end of the medium has passed through the position of the second center sensor 121 when the signal value of the second center signal changes from a value indicating that the medium is present to a value indicating that there is no medium.

When the second center sensor 121 has not detected the rear end of the medium yet, the determination module 153 determines whether or not a fourth number of times wherein the motor for driving the feed rollers 114 is driven by a fourth driving amount is equal to or more than a fourth threshold value (step S303). An initial value of the fourth threshold value is set to a number of times of retries (for example, three) allowed for the medium conveying apparatus 100. The fourth threshold may be changed by the change processing. When the fourth number of times is less than the fourth threshold, the determination module 153 returns the process to step S301, and repeats the process of step S301 to S303.

On the other hand, when the fourth number of times is equal to or more than the fourth threshold value, the determination module 153 determines that the conveyance abnormality of the medium has occurred downstream of the imaging device 122 (step S304), and ends the series of steps. In other words, the determination module 153 determines that the conveyance abnormality of the medium has occurred when the second center sensor 121 does not detect the rear end of the medium when the motor for driving the feed rollers 114 is driven by the fourth predetermined amount after the front end of the medium passes through the position of the imaging device 122. The fourth predetermined amount is an amount acquired by multiplying the fourth driving amount by the fourth threshold value. In this case, the control module 151 stops feeding and conveying the medium.

On the other hand, in step S302, when the second center sensor 121 has detected the rear end of the medium, the determination module 153 determines that the conveyance abnormality of the medium has not occurred (step S305). In other words, the determination module 153 determines that the conveyance abnormality of the medium has not occurred when the second center sensor 121 detects the rear end of the medium until the motor for driving the feed roller 114 is driven by the fourth predetermined amount.

The fourth predetermined time for driving the motor for driving the feed roller 114 by the fourth predetermined amount is uniquely determined by the fourth driving amount and the fourth threshold value. That is, the determination module 153 determines that the conveyance abnormality of the medium has occurred when a time from when the medium reaches the imaging position of the imaging device 122 until the second center sensor 121 detects the rear end of the medium is equal to or more than the fourth predetermined time. On the other hand, the determination module 153 determines that the conveyance abnormality of the medium has not occurred when the time from when the medium reaches the imaging position of the imaging device 122 until the second center sensor 121 detects the rear end of the medium is less than the fourth predetermined time. Thus, the determination module 153 determines whether or not the conveyance abnormality of the medium has occurred, based on a comparison between the time from when the medium reaches the imaging position of the imaging device 122 until the second center sensor 121 detects the rear end of the medium and a threshold value (the fourth predetermined time).

Next, the image acquisition module 155 acquires each line image generated during the medium conveyance from the imaging device 122, and generates an input image by synthesizing all the acquired line images (step S306).

Next, the image acquisition module 155 transmits the input image to the information processing device through the interface device 132 (step S307), When not being connected to the information processing device, the image acquisition module 155 stores the input image in the storage device 140.

Next, the size detection module 156 detects a size of the medium fed by the feed rollers 114 from the input image and stores the detected size in the slip degree table (step S308). The size detection module 156, in the same manner as in the process of step S212, extracts edge pixels from the input image for each of the horizontal direction (the main scanning direction) and the vertical direction (the sub scanning direction), and generates an edge image including edge pixels for each of the horizontal direction and the vertical direction. Next, the size detection module 156 extracts a plurality of straight lines from each edge image for the horizontal direction and the vertical direction. The size detection unit 156 detects a straight line using the Hough transform. The size detection module 156 may detect a straight line using the least squares method. Further, the size detection module 156 may combine edge pixels adjacent to each other in each edge image as a group by labeling, and detect an approximate straight line connecting two edge pixels located at both ends in the horizontal direction or the vertical direction of each group as a straight line.

Next, the size detection module 156 detects a rectangle from the detected plurality of straight lines. The size detection module 156 extracts a plurality of rectangle candidates composed of four straight lines where two pairs of the straight lines of the detected plurality of straight lines are substantially perpendicular to each other. The size detection module 156, first selects a horizontal straight line (hereinafter referred to as a first horizontal line) and extracts a horizontal straight line (hereinafter referred to as a second horizontal line) that is substantially parallel (for example, within ±3°) to the selected straight line and at a distance equal to or more than a first distance. Next, the size detection module 156 extracts a vertical straight line (hereinafter referred to as a first vertical line) that is substantially perpendicular (for example within ±3° from 90°) to the first horizontal line. Next, the size detection module 156 extracts a vertical straight line (hereinafter referred to as a second vertical line) that is substantially perpendicular to the first horizontal line and at a distance equal to or more than a second distance from the first vertical line. The first distance and the second distance are predetermined according to a size of a target medium to be read by the medium conveying apparatus 100 and may be the same value.

The size detection module 156 extracts all combinations of the first horizontal line, the second horizontal line, the first vertical line and the second vertical line satisfying the above conditions among all of the extracted straight lines, and detects a rectangular candidates having the largest area among the rectangular candidates formed by each of the extracted combinations, as a rectangle. The size detection module 156 detects a size corresponding to an image size of the detected rectangle as the size of the fed medium. The size detection module 156 stores the detection size in association with the identification number of the conveyed medium in the slip degree table.

Next, the skew detection module 157 stores the skew flag set for the medium fed by the feed roller 114 in the slip degree table (step S309). The skew detection unit 157 stores the set skew flag in association with the identification number of the fed medium in the slip degree table.

Next, the control module 151 determines whether or not the medium remains on the medium tray 103 based on the first medium signal acquired from the contact sensor 113 (step S310). When a medium remains on the medium tray 103, the control module 151 returns the process to step S103 and repeats the processes in steps S103 to S310. On the other hand, when a medium does not remain on the medium tray 103, the control module 151 ends the series of steps.

The medium conveying apparatus 100 may execute at least one of the processes of steps S107 to S110, steps S202 to S205, steps S211 to S215, and steps S302 to S305, and may omit other processes. The medium conveying apparatus 100 may also omit the process of step S208, step S308 or step S309.

Further, in step S103, the medium amount detection module 152 may detect a height of the medium, based on a position where the pick arm 112 for pressing the medium placed on the medium tray 103 is located. Further, the medium amount detection module 152 may detect the height of the medium from the image acquired by imaging the medium placed on the medium tray 103. In that case, the imaging sensor to image the medium placed on the medium tray 103 are located in the medium conveying apparatus 100. The medium amount detection module 152 detects the height of the medium from the image imaged by the imaging sensor, using known image processing techniques. Further, the medium amount detection module 152 may detect a weight of the medium placed on the medium tray 103, as the medium amount. In that case, a weight sensor is located on a mounting surface of the medium tray 103 in the medium conveying apparatus 100. The medium amount detection module 152 detects the weight of the medium based on the weight measured by the weight sensor.

Figure 10:
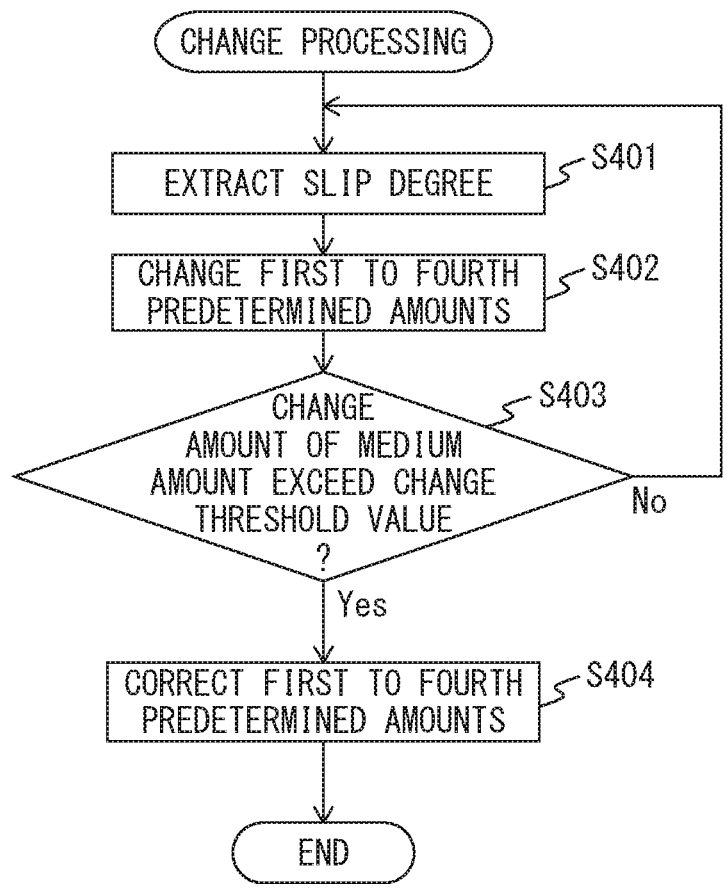
FIG. 10 is a flowchart illustrating an operation example of a change processing.

FIG. 10 is a flowchart illustrating an operation example of the change processing. The flow of operations shown in FIG. 10 is performed in step S104 of the flow chart shown in FIG. 7.

First, the determination module 153 extracts the slip degree (hereinafter, may be referred to as a target slip degree) used to change the first to fourth predetermined amounts among the slip degrees of the media fed in the past (step S401). The determination module 153 extracts slip degrees calculated for the most recent predetermined number (for example, 20) of media in the slip degree table, as the target slip degree. The determination module 153 may extract slip degrees calculated for the medium conveyed in the most recent predetermined time (e.g., 1 hour), as the target slip degree. Further, the determination module 153 may extract slip degrees calculated for the most recent predetermined number of media among the media conveyed in the most recent predetermined time, as the target slip degree.

Next, the determination module 153 changes the first to fourth predetermined amounts based on the extracted target slip degree (step S402). For example, the determination module 153 changes the first to fourth predetermined amounts by changing only the first to fourth threshold values without changing the first to fourth driving amounts from the initial values. In that case, the determination module 153 changes the first to fourth threshold values such that the larger the target slip degree is, the larger the first to fourth thresholds are. The determination module 153 may change the first to fourth predetermined amounts by changing only the first to fourth driving amounts without changing the first to fourth threshold values from the initial values. In that case, the determination module 153 changes the first to fourth driving amounts so that the larger the target slip degree is, the larger the first to fourth driving amounts are. A relationship between the target slip degree and each threshold value or each driving amount is set based on a prior experiment in which, for example, a slip degree and an amount wherein a motor is driven to convey a medium are measured using various feed rollers 114 and brake rollers 115 having different degrees of abrasion, respectively.

As described above, the first to fourth predetermined times for driving the motor for driving the feed rollers 114 by the first to fourth predetermined amounts are uniquely determined by the first to fourth driving amounts and the first to fourth threshold values. Accordingly, the determination module 153 changes the first to fourth predetermined times together with the first to fourth predetermined amounts by changing the first to fourth driving amounts or the first to fourth threshold values.

Further, the determination module 153 may not use the slip degree of the medium for which the skew is detected by the skew detection module 157, to change the first to fourth predetermined amounts. In that case, in the step S401, the determination module 153 excludes the slip degree calculated for the medium for which the skew flag is set to ON in the slip degree table from the target slip degree, without extracting the slip degree as the target slip degree. When the skew of the medium occurs, the medium may be conveyed while rotating, and the slip degree may not be calculated correctly. The determination module 153 can appropriately change the first to fourth predetermined amounts by excluding the slip degree of the medium for which the skew is detected from the target slip degree.

Further, the determination module 153 may not use the slip degree of the medium of which the size detected by the size detection module 156 is equal to or less than a predetermined size, to change the first to fourth predetermined amounts. In this case, in step S401, the determination module 153 excludes the slip degree calculated for the medium whose size stored in the slip degree table is equal to or less than the predetermined size (e.g., A6) from the target slip degree, without extracting the slip degree as the target slip degree. In general, the smaller the size of the conveyed medium is, the smaller the slip degree calculated for the medium is. By excluding the slip degree calculated for the small medium from the target slip degree, the determination module 153 can suppress erroneous determination that the conveyance abnormality of the medium has occurred when the medium of the normal size is conveyed. In particular, when the small medium and the medium of the normal size are mixed and conveyed, the determination module 153 can suppress erroneous determination that the conveyance abnormality of the medium has occurred.

Next, the determination module 153 determines whether or not a change amount of the medium amount detected by the medium amount detection module 152 during feeding of the medium fed currently with respect to the medium amount detected by the medium amount detection module 152 during feeding of the medium fed immediately before, exceeds a change threshold value (step S403). The change threshold value is set in advance to, for example, a medium amount that affects the slip degree. When the change amount of the medium amount is equal to or less than the change threshold value, the determination module 153, without performing a particular process, ends the series of steps.

On the other hand, when the change amount of the medium amount exceeds the change threshold value, the determination module 153 corrects the first to fourth predetermined amounts changed in step S402, based on the medium amount (step S404), and ends the series of steps. The determination module 153 corrects the first to fourth predetermined amounts (and the first to fourth predetermined times) by correcting the first to fourth threshold values or the first to fourth driving amounts. As described above, in the bottom-first type medium conveying apparatus 100, the larger the amount of the medium placed on the medium tray 103 is, the larger the frictional force between the fed medium and the medium placed thereon is. That is, as the amount of the medium placed on the medium tray 103 is larger, the medium is likely to slip. Accordingly, the determination module 153 corrects the first to fourth threshold values or the first to fourth driving amounts so that the larger the medium amount detected during feeding of the medium fed currently is, the larger the first to fourth thresholds or the first to fourth driving amounts is. Thus, the medium conveying apparatus 100 can suppress erroneous determination that the conveyance abnormality of the medium has occurred when the medium amount of the medium placed on the medium tray 103 is large.

Further, in the bottom-first type medium conveying apparatus 100, during the feeding of the medium, a new medium may be added by the user, thereby, the frictional force between the fed medium and the medium placed thereon may increase. The medium conveying apparatus 100 corrects the first to fourth predetermined amounts when the change amount of the medium amount exceeds the change threshold value, so that the medium conveying apparatus 100 can prevent erroneous determination that the conveyance abnormality of the medium has occurred when a new medium is added by the user.

In step S402, the determination module 153 may change at least one predetermined amount among the first to fourth predetermined amounts, and may omit the change of the other predetermined amount. Further, in step S404, the determination module 153 may correct at least one predetermined amount among the first to fourth predetermined amounts, and may omit the correction of the other predetermined amount. Further, the determination module 153 may omit the processes of steps S403 to S404 themselves. Further, the determination module 153 may omit the process of step S403 and correct the first to fourth predetermined amounts based on the medium amounts in step S404 regardless of whether the change amount of the medium amount exceeds the change threshold value.

Figure 11:
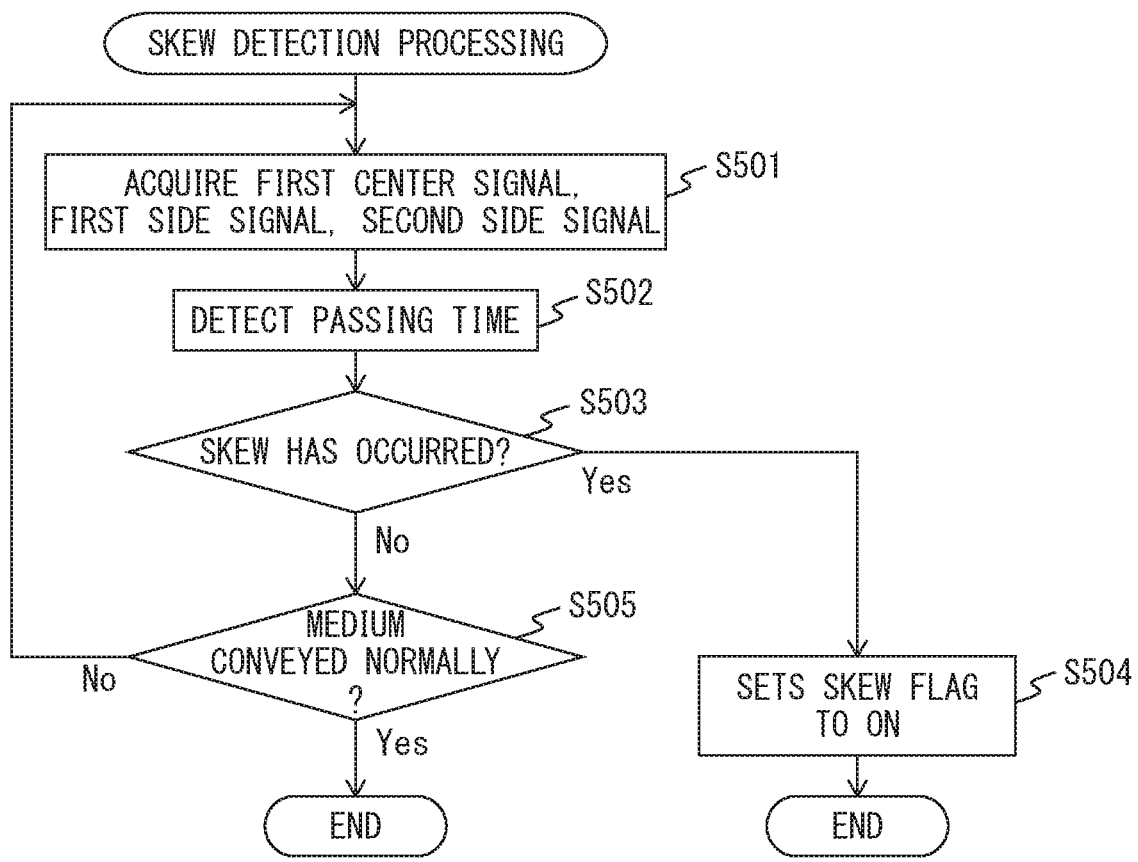
FIG. 11 is a flowchart illustrating an operation example of skew detection processing.

FIG. 11 is a flowchart illustrating an operation example of a skew detection processing of the medium conveying apparatus 100.

Hereinafter, an example of the operation of the skew detection processing of the medium conveying apparatus 100 will be described with referring to the flowchart illustrated in FIG. 11. The operation flow described below is executed mainly by the processing circuit 150 in cooperation with each element in the medium conveying apparatus 100, in accordance with a program previously stored in the storage device 140. The flow of operations shown in FIG. 11 is performed each time the medium is fed.

First, the skew detection module 157 acquires the first center signal, the first side signal and the second side signal, respectively, from the first center sensor 116, the first side sensor 117 and the second side sensor 118 (step S501).

Next, the skew detection module 157 detects a passing time at which the front end of the medium passes through the first center sensor 116, the first side sensor 117 and the second side sensor 118, respectively, based on the first center signal, the first side signal and the second side signal (step S502).

The skew detection module 157 detects a time at which a signal value has changed from a value indicating a state in which there is no medium to a value indicating a state in which the medium is present, in the first center signals acquired to the present, as the passing time of the first center sensor 116. Similarly, the skew detection module 157 detects a time at which a signal value has changed from a value indicating a state in which there is no medium to a value indicating a state in which the medium is present, in the first side signals acquired to the present, as the passing time of the first side sensor 117. Similarly, the skew detection unit 157 detects a time at which a signal value has changed from a value indicating a state in which there is no medium to a value indicating a state in which the medium is present, in the second side signals acquired to the present, as the passing time of the second side sensor 118.

Next, the skew detection module 157 determines whether or not the skew of the medium has occurred based on the detected respective passing times (step S503). The skew detection module 157 determines that the skew has occurred when the front end of the medium does not pass through the first center sensor 116 until a predetermined time has elapsed from the earlier time of the passing time of the first side sensor 117 or the passing time of the second side sensor 118. The predetermined time, for example, is set in advance to a difference (for example 1 second) between the passing time of the first side sensor 117 or the second side sensor 118 and the passing time of the first center sensor 116 which affects the slip degree. The predetermined time may be set to 0.

When the skew detection module 157 determines that the skew of the medium has occurred, the skew detection module 157 sets the skew flag stored in association with the identification number of the conveyed medium to ON in the slip degree table (step S504), and ends the series of steps. Thus, the skew detection module 157 detects the skew of the medium fed by the feed rollers 114. The skew detection module 157 may stop the motor 131, and stop feeding and conveying of the medium when the skew detection module 157 determines that the skew of the medium has occurred.

On the other hand, when the skew detection module 157 determines that the skew of the medium has not occurred, the skew detection module 157 determines whether or not the medium is normally conveyed, based on the detected respective passing times (step S505). The skew detection module 157 determines that the medium is normally conveyed when the front end of the medium passes through the first center sensor 116 until the predetermined time has elapsed from the earlier time of the passing time of the first side sensor 117 or the passing time of the second side sensor 118. In this case, the skew detection module 157 ends the series of steps. On the other hand, when the predetermined time has not elapsed from the earlier time of the passing time of the first side sensor 117 or the passing time of the second side sensor 118 and the front end of the medium has not passed through the first center sensor 116, the skew detection module 157 returns the process to step S501. In other words, in this case, the skew detection module 157 does not yet determine whether the skew has occurred or the medium is normally conveyed.

The skew detection module 157 may detect the skew of the medium based on the input image, using a known image processing technique.

Hereinafter, a technical meaning of changing the first to fourth predetermined amounts based on the degree of the slip occurred between the medium and the feed rollers 114 from when the front end of the medium passes through the position of the first center sensor 116 until the front end of the medium passes through the position of the second center sensor 121, will be described.

The larger the degree of the abrasion of the feed rollers 114 and the brake rollers 115 is, the lower a speed at which the medium is fed by the feed rollers 114 and the brake rollers 115 (a moving speed of the medium) is, and the longer a time until the medium reaches a predetermined position is. If the medium conveying apparatus determines whether or not the conveyance abnormality of the medium has occurred by comparing a time (the driving amount of the motor) in which the medium moves to the predetermined position with the fixed threshold value, the medium conveying apparatus easily determines that the conveyance abnormality of the medium has occurred when the degree of the abrasion of each roller increases. As a result, the medium conveying apparatus may erroneously determine that the conveyance abnormality of the medium has occurred, even though the conveyance abnormality of the medium has not occurred. On the other hand, by changing the first to fourth predetermined amounts based on the slip degree of the medium fed in the past, the medium conveying apparatus 100 can set the first to fourth predetermined amounts to an appropriate amount according to the degree of the present abrasion of the feed rollers 114 and the brake rollers 115. As a result, the medium conveying apparatus 100 can suitably determine whether or not the conveyance abnormality of the medium has occurred.

Figure 12:
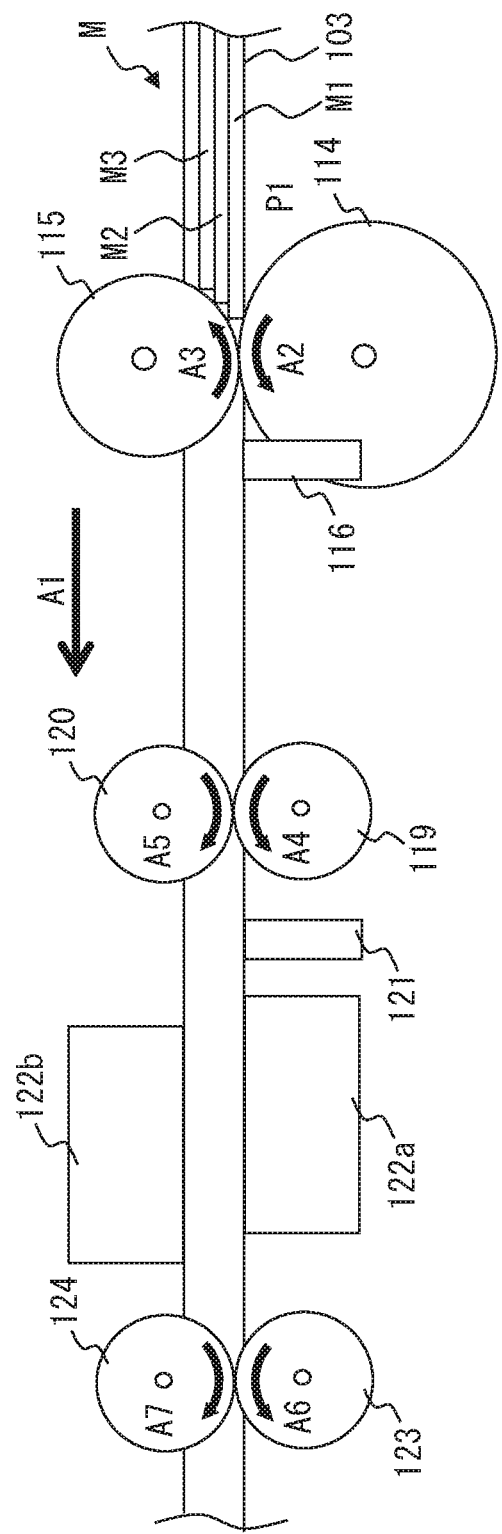
FIG. 12 is a schematic diagram for explaining a positional relationship between each roller and each sensor.

FIG. 12 is a schematic diagram for illustrating a positional relationship between each roller and each sensor.

As shown in FIG. 12, the medium M placed on the medium tray 103 is fed by the feed rollers 114 and the brake rollers 115. However, the position of the front end of the medium M at the start of feeding, in particular, the position of the front end of the medium M with respect to the nip position of the feed rollers 114 and the brake rollers 115 differs depending on a position or procedure wherein the user places the medium M. For example, there are a case where the front end of each medium M is shifted obliquely little by little, and the front end of the lowermost medium M1 is located near the nip position, and case where the front end of each medium M is aligned at the same position, and the front end of the medium M1 is located away from the nip position. Further, there is a case where the media M2 and M3 placed on the upper side of the medium M1 are pushed back to the upstream side by the brake roller 115 rotating in the opposite direction A3 to the medium feeding direction when the medium M1 is fed. Also, the positions of the front end of the media M2, M3 when the media M2, M3 is fed, change depending on an amount pushed back by the brake rollers 115.

The time from when the feed roller 114 and the brake roller 115 start feeding the medium until the medium passes through the nip positions of the feed rollers 114 and the brake rollers 115 changes (varies) depending on the position of the front end of the medium at the start of feeding. Therefore, if the slip degree is calculated based on the time (the driving amount of the motor) from the start of feeding the medium until passing through the position of the second center sensor 121, a variation occurs in the calculated slip degree depending on the position of the front end of the medium at the start of feeding. In particular, in a small medium conveying apparatus such as a scanner, since a distance between the feed rollers 114 and the brake rollers 115, and the imaging device 122 is small, a degree of an influence on the calculated slip degree is large due to variations in the positions of the front ends of the media at the start of feeding.

On the other hand, the medium conveying apparatus 100 calculates the slip degree based on the driving amount of the motor from when the front end of the medium passes through the position of the first center sensor 116 located on the downstream side of the feed rollers 114 and the brake rollers 115 until the front end of the medium passes through the position of the second center sensor 121. Therefore, the medium conveying apparatus 100 can stably calculate the slip degree regardless of the position of the front end of the medium at the start of feeding. Thus, the medium conveying apparatus 100 can suitably change the first to fourth predetermined amounts based on the stably calculated slip degree, and as a result, the medium conveying apparatus 100 can suitably determine whether or not the conveyance abnormality of the medium has occurred.

As described in detail above, the medium conveying apparatus 100 changes the parameters used for determining the conveyance abnormality of the medium, based on the degree of the slip occurred between the medium and the feed rollers 114 while the medium passes between the first center sensor 116 and the second center sensor 121. Thus, the medium conveying apparatus 100 can more accurately determine whether or not the conveyance abnormality of the medium has occurred. Further, the medium conveying apparatus 100 can stop the conveyance of the medium when the conveyance abnormality of the medium occurs, and thereby suppress the medium is damaged by the jam of the medium.

Figure 13:
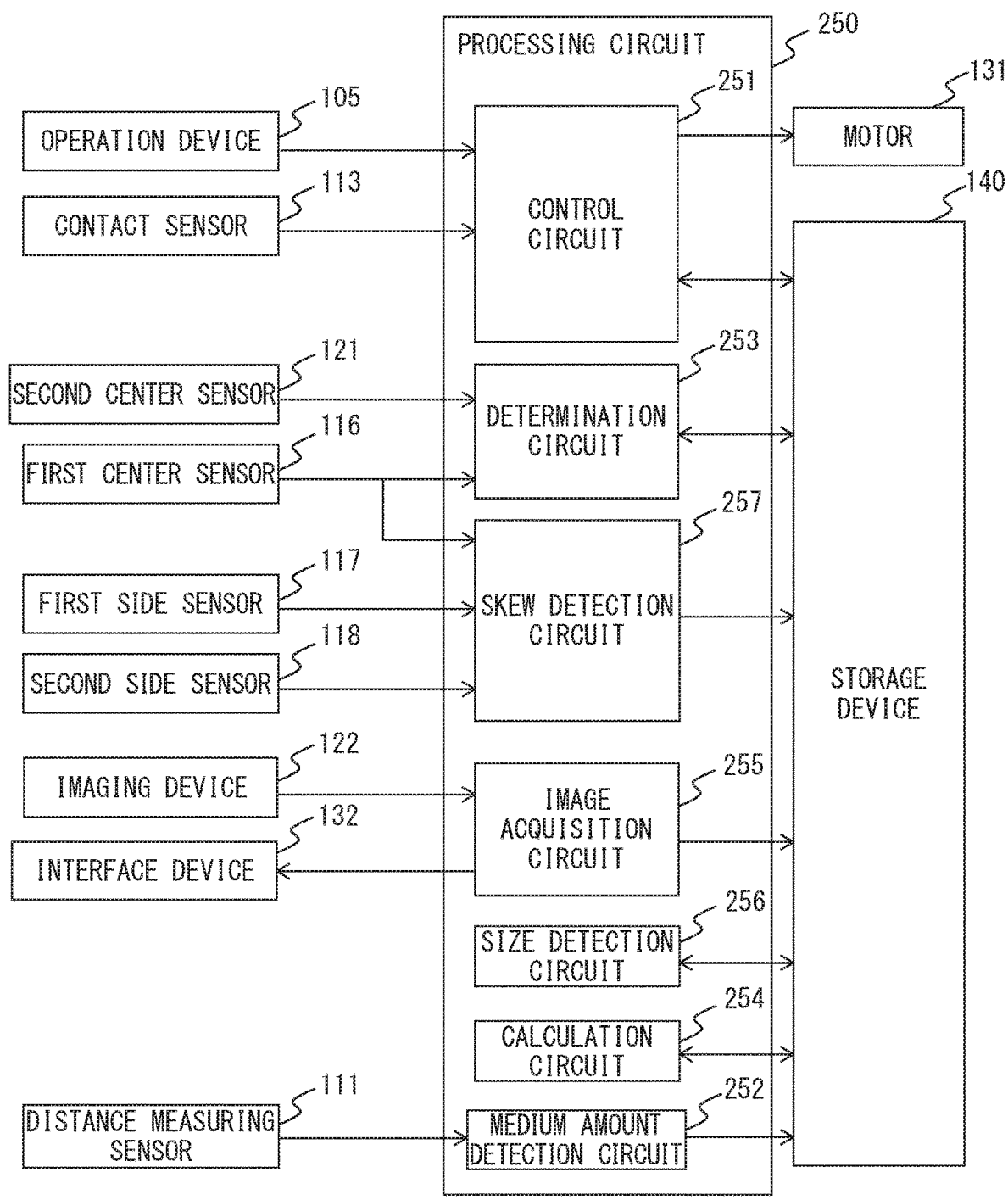
FIG. 13 is a diagram illustrating a schematic configuration of another processing circuit 250.

FIG. 13 is a diagram illustrating a schematic configuration of a processing circuit 250 in a medium conveying apparatus according to another embodiment. The processing circuit 250 is used in place of the processing circuit 150 of the medium conveying apparatus 100 and executes the medium reading processing and the change processing in place of the processing circuit 150. The processing circuit 250 includes a control circuit 251, a medium amount detection circuit 252, a determination circuit 253, a calculation circuit 254, an image acquisition circuit 255, a size detection circuit 256, a skew detection circuit 257, etc. Note that each unit may be configured by an independent integrated circuit, a microprocessor, firmware, etc.

The control circuit 251 is an example of a control module and has a function similar to the control module 151. The control circuit 251 receives the operation signal from the operation device 105, the first medium signal from the contact sensor 113, and a determination result of the conveyance abnormality of the medium from the storage device 140. The control circuit 251 drives the motor 131 in response to each received signal to control feeding and conveying of the medium by the rollers, and stores the driving amount of the motor 131 in the storage device 140.

The medium amount detecting circuit 252 is an example of a medium amount detection module, and has the same function as the medium amount detection module 152. The medium amount detecting circuit 252 receives the optical signal from the distance measuring sensor 111, detects the medium amount based on the received optical signal, and stores the detection result in the storage device 140.

The determination circuit 253 is an example of a determination module has a functions similar to the determination module 153. The determination circuit 253 receives the first center signal from the first center sensor 116, the second center signal from the second center sensor 121, the drive amount of the motor 131, the slip degree, the medium amount, the size of the medium and the detection result of the skew from the storage device 140. The determination circuit 253 determines whether or not the conveyance abnormality of the medium has occurred based on the received information, and stores the determination result in the storage device 140.

The calculation circuit 254 is an example of a calculation module, and has a function similar to the calculation module 154. The calculation circuit 254 receives the driving amount of the motor 131 from the storage device 140, calculates the slip degree based on the received information, and stores the calculated slip degree in the storage device 140.

The image acquisition circuit 255 is an example of an image acquisition module and has a function similar to the image acquisition module 155. The Image acquisition circuit 255 receives the line image from the imaging device 122, generates the input image, and transmits the input image to the information processing apparatus via the interface device 132, and stores it in the storage device 140.

The size detection circuit 256 is an example of a size detection module, and has a function similar to the size detection module 156. The size detection circuit 256 receives the input image from the storage device 140, detects the size of the medium based on the received input image, and stores it in the storage device 140.

The skew detection circuit 257 is an example of a skew detection module and has a function similar to the skew detection module 157. The skew detection circuit 257 receives the first center signal from the first center sensor 116, the first side signal from the first side sensor 117, the second side signal from the second side sensor 118. The skew detection circuit 257 detects the skew of the medium based on each received signal, and stores the detection result in the storage device 140.

As described in detail above, the medium conveying apparatus can more accurately determine whether or not the conveyance abnormality of the medium has occurred even when using the processing circuit 250.

According to the embodiment, the medium conveying apparatus, the method, and the computer-readable, non-transitory medium storing the control program, can more accurately determine whether or not the conveyance abnormality of the medium has occurre.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:
1. A medium conveying apparatus comprising:
a feed roller to separate and feed a medium;
a motor to drive the feed roller;
an imaging device to image the medium;
a conveyance roller to convey the medium fed by the feed roller to the imaging device;
a first medium sensor located between the feed roller and the conveyance roller;
a second medium sensor located between the conveyance roller and the imaging device; and
a processor to
determine that a conveyance abnormality of the medium has occurred when the first medium sensor does not detect the medium when the motor is driven by a first predetermined amount after starting feeding of the medium, or when the second medium sensor does not detect the medium when the motor is driven by a second predetermined amount after the first medium sensor detects the medium, in a current imaging, and
calculate a degree of a slip occurred between the medium and the feed roller from when a front end of the medium passes through a position of the first medium sensor until the front end of the medium passes through a position of the second medium sensor, wherein the processor changes the first predetermined amount or the second predetermined amount based on the degree of the slip of a medium fed in a previous imaging, to be used for a next imaging.

2. The medium conveying apparatus according to claim 1, wherein the processor calculates the degree of the slip, based on a driving amount of the motor from when the front end of the medium passes through the position of the first medium sensor until the front end of the medium passes through the position of the second medium sensor.

3. The medium conveying apparatus according to claim 1, wherein the processor further
detects a skew of the medium fed by the feed roller, and
does not use the degree of the slip of the medium for which the skew is detected, to change the first predetermined amount or the second predetermined amount.

4. The medium conveying apparatus according to claim 1, further comprising a medium tray, wherein
the feed roller sequentially feeds the medium placed on the medium tray from a lower side, and wherein the processor further
detects a medium amount of the medium placed on the medium tray, and
corrects the degree of the slip, based on the medium amount.

5. The medium conveying apparatus according to claim 4, wherein the processor further corrects the first predetermined amount or the second predetermined amount, based on the medium amount.

6. The medium conveying apparatus according to claim 4, wherein the processor further corrects the first predetermined amount or the second predetermined amount when a change amount of the medium amount exceeds a change threshold value.

7. The medium conveying apparatus according to claim 1, wherein the processor further
detects a size of the medium fed by the feed roller, and
does not use the degree of the slip of the medium of which the detected size is equal to or less than a predetermined size, to change the first predetermined amount or the second predetermined amount.

8. A method for controlling conveyance of a medium, comprising:
separating and feeding a medium by a feed roller;
driving the feed roller by a motor;
imaging by an imaging device;
conveying the medium fed by the feed roller to the imaging device by a conveyance roller;
determining that a conveyance abnormality of the medium has occurred when a first medium sensor located between the feed roller and the conveyance roller does not detect the medium when the motor is driven by a first predetermined amount after starting feeding of the medium, or when a second medium sensor located between the conveyance roller and the imaging device does not detect the medium when the motor is driven by a second predetermined amount after the first medium sensor detects the medium, in a current imaging; and
calculating a degree of a slip occurred between the medium and the feed roller from when a front end of the medium passes through a position of the first medium sensor until the front end of the medium passes through a position of the second medium sensor, wherein
the first predetermined amount or the second predetermined amount is changed based on the degree of the slip of a medium fed in a previous imaging, to be used for a next imaging.

9. The method according to claim 8, wherein the degree of the slip is calculated based on a driving amount of the motor from when the front end of the medium passes through the position of the first medium sensor until the front end of the medium passes through the position of the second medium sensor.

10. The method according to claim 8, further comprising detecting a skew of the medium fed by the feed roller, wherein
the degree of the slip of the medium for which the skew is detected is not used to change the first predetermined amount or the second predetermined amount.

11. The method according to claim 8, wherein
the feed roller sequentially feeds the medium placed on a medium tray from a lower side, the method further comprising:
detecting a medium amount of the medium placed on the medium tray; and
correcting the degree of the slip, based on the medium amount.

12. The method according to claim 11, further comprising correcting the first predetermined amount or the second predetermined amount, based on the medium amount.

13. The method according to claim 11, further comprising correcting the first predetermined amount or the second predetermined amount when a change amount of the medium amount exceeds a change threshold value.

14. The method according to claim 8, further comprising detecting a size of the medium fed by the feed roller, wherein
the degree of the slip of the medium of which the detected size is equal to or less than a predetermined size is not used to change the first predetermined amount or the second predetermined amount.

15. A computer-readable, non-transitory medium storing a computer program, wherein the computer program causes a medium conveying apparatus including a feed roller to separate and feed a medium, a motor to drive the feed roller, an imaging device to image the medium, a conveyance roller to convey the medium fed by the feed roller to the imaging device, a first medium sensor located between the feed roller and the conveyance roller, a second medium sensor located between the conveyance roller and the imaging device, to execute a process, the process comprising:
determining that a conveyance abnormality of the medium has occurred when the first medium sensor does not detect the medium when the motor is driven by a first predetermined amount after starting feeding of the medium, or when the second medium sensor does not detect the medium when the motor is driven by a second predetermined amount after the first medium sensor detects the medium, in a current imaging; and
calculating a degree of a slip occurred between the medium and the feed roller from when a front end of the medium passes through a position of the first medium sensor until the front end of the medium passes through a position of the second medium sensor, wherein
the first predetermined amount or the second predetermined amount is changed based on the degree of the slip of a medium fed in a previous imaging, to be used for a next imaging.

16. The computer-readable, non-transitory medium according to claim 15, wherein the degree of the slip is calculated based on a driving amount of the motor from when the front end of the medium passes through the position of the first medium sensor until the front end of the medium passes through the position of the second medium sensor.

17. The computer-readable, non-transitory medium according to claim 15, the process further comprising detecting a skew of the medium fed by the feed roller, wherein
- the degree of the slip of the medium for which the skew is detected is not used to change the first predetermined amount or the second predetermined amount.

18. The computer-readable, non-transitory medium according to claim 15, wherein
- the feed roller sequentially feeds the medium placed on a medium tray from a lower side, the process further comprising:
- detecting a medium amount of the medium placed on the medium tray; and
- correcting the degree of the slip, based on the medium amount.

19. The computer-readable, non-transitory medium according to claim 18, the process further comprising correcting the first predetermined amount or the second predetermined amount, based on the medium amount.

20. The computer-readable, non-transitory medium according to claim 18, the process further comprising correcting the first predetermined amount or the second predetermined amount when a change amount of the medium amount exceeds a change threshold value.

* * * * *